United States Patent
Uehira et al.

(10) Patent No.: US 7,314,654 B2
(45) Date of Patent: Jan. 1, 2008

(54) OPTICALLY ANISOTROPIC ELEMENT COMPRISING DISCOTIC COMPOUND

(75) Inventors: Shigeki Uehira, Kanagawa (JP); Michitaka Matsuumi, Kanagawa (JP); Atsuhiro Ohkawa, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 145 days.

(21) Appl. No.: 11/041,314

(22) Filed: Jan. 25, 2005

(65) Prior Publication Data

US 2005/0163941 A1    Jul. 28, 2005

(30) Foreign Application Priority Data

Jan. 26, 2004  (JP) .............................. 2004-017611

(51) Int. Cl.
    C09K 19/32    (2006.01)
    C09K 19/38    (2006.01)
    C07C 69/76    (2006.01)
(52) U.S. Cl. ..................... 428/1.1; 252/299.62; 560/80
(58) Field of Classification Search ........... 252/299.62; 428/1.1; 560/80
    See application file for complete search history.

(56) References Cited

U.S. PATENT DOCUMENTS 4,333,709 A * 6/1982 Dubois et al. ............ 252/299.4

6,461,694 B1 * 10/2002 Nishikawa et al. .......... 428/1.3

FOREIGN PATENT DOCUMENTS

JP      09-138413     *  5/1997
JP      2000-86591    *  3/2000

OTHER PUBLICATIONS

Englidh translation by computer for JP 2000-086591, http://www4.ipdl.ncipi.go.jp/Tokujitu/PAJdetail.ipdl?N0000=60&N0120=01&N2001=2&N3001=2000-086591.*
CAPLUS 2000: 198008.*
English translation by computer for JP 09-138413, http://www4.ipdl.inpit.go.jp/Tokujitu/PAJdetail.ipdl?N0000=60&N0120=01&N2001=2&N3001=H09-138413.*
CAPLUS 1994: 322477.*

* cited by examiner

*Primary Examiner*—Shean C Wu
(74) *Attorney, Agent, or Firm*—Buchanan Ingersoll & Rooney PC

(57) ABSTRACT

An optically anisotropic element comprises a discotic compound. The discotic compound has an oriented discotic plane. The discotic compound has a molecular structure including a discotic core and 3 to 20 combinations of ester bonds (—O—CO—) and 1- or 2-alkenyl groups. The alkenyl group can have a polymerizable group as a substituent group positioned at the terminal. A polymerizable discotic compound having an oriented discotic plane can be polymerized to form an optically anisotropic element. Alignment of the oriented discotic plane is fixed by polymerization. A new triphenylene compound is also disclosed.

16 Claims, No Drawings

OPTICALLY ANISOTROPIC ELEMENT COMPRISING DISCOTIC COMPOUND

FIELD OF THE INVENTION

The present invention relates to an optically anisotropic element comprising a discotic compound, which has a molecular structure including an ester of discotic core with an unsaturated carboxylic acid. The invention also relates to an optically anisotropic element formed by polymerizing a polymerizable discotic compound. The invention further relates to a new triphenylene compound.

BACKGROUND OF THE INVENTION

An optically anisotropic layer is formed through the steps of aligning discotic liquid crystal molecules and fixing the alignment. The discotic liquid crystal molecules give large birefringence, and can be oriented according to various alignment modes. An optical compensatory sheet obtained from the discotic molecules, therefore, has specific optical characters that cannot be given by a conventional stretched birefringent film. Molecular Crystals and Liquid Crystals, vol. 84(1982), pp. 193 discloses a discotic liquid crystal triphenylene compound showing negative birefringence. All the liquid crystal molecules should be evenly aligned in the optical compensatory sheet. In other words, the discotic liquid crystal molecules are preferably oriented in monodomain alignment. However, conventional discotic liquid crystal molecules generally orient themselves in dual-domain alignment. Therefore, defects are often observed on the border of the two domains. Accordingly, conventional discotic liquid crystal molecules often do not show enough optical characters to be used in the optical compensatory sheet. The optical characters generally depend upon the structure of discotic liquid crystal molecule. Therefore, many discotic liquid crystal compounds have been studied and developed to obtain desired optical characters. For example, Japanese Patent Provisional Publication No. 8(1996)-50206 discloses an optical compensatory sheet comprising a transparent support and a thereon-provided optically anisotropic layer containing discotic liquid crystal molecules.

Japanese Patent Provisional Publication Nos. 7(1995)-306317 and 9(1997)-104866 disclose 2,3,6,7,10,11-hexa{4-(4-acryloyloxyhexyloxy)benzoyloxy}triphenylene as a discotic liquid crystal compound suitable for forming an optically anisotropic layer of optical compensatory sheet.

The retardation (Δnd) of the optical compensatory sheet is designed according to optical characters of the liquid crystal cell to be compensated. The value of retardation (Δnd) is a product of birefringent anisotropy (Δn) and thickness (d) of the optically anisotropic layer. Even if the thickness (d) is small, an optically anisotropic layer having sufficient birefringent anisotropy (Δn) can compensate the liquid crystal cell. However, it is very difficult to prepare the optically anisotropic layer having sufficient birefringent anisotropy (Δn) from known discotic liquid crystal compounds, for example, those disclosed in Japanese Patent Provisional Publication Nos. 7(1995)-306317 and 9(1997)-104866.

Japanese Patent Provisional Publication No. 2001-166147 discloses a discotic liquid crystal compound having large birefringent anisotropy. However, the disclosed compound has a poor optical character on wavelength dispersion. In other words, the compound enlarges the wavelength dispersion. Therefore, the resultant optical compensatory sheet cannot be sufficiently improved.

Generally, the character on wavelength dispersion inversely relates to birefringent anisotropy. In other words, the more the birefringent anisotropy is increased, the more the wavelength dispersion is usually impaired. If the wavelength dispersion is impaired, the optical compensatory sheet cannot fully prevent a displayed color image from changing chromaticity unfavorably. It has been desired to improve both the birefringent anisotropy and the character on wavelength dispersion at the same time.

It is known that phases formed by discotic liquid crystal compounds are roughly categorized into three phases, namely, a columnar phase, a discotic nematic ($N_D$) phase, and a chiral discotic nematic phase. In the columnar phase, central cores of the discotic molecules are piled up in the form of columns through intermolecular force. In the discotic nematic phase, the discotic molecules aggregate randomly. W. H. de Jeu (Physical properties of liquid crystalline materials, Gordon and Breach Science Publishers, 1980) reports that the discotic nematic phase is seldom observed while the columnar phase is often observed. In addition, the discotic nematic phase of triphenylene compound has been observed only in the case that the triphenylene compound has benzoyloxy or cinnamoyl substituent groups at 2, 3, 6, 7, 10 and 11-positions.

SUMMERY OF THE INVENTION

It is an object of the present invention to provide an optically anisotropic element excellent in both the birefringent anisotropy and the character on wavelength dispersion.

It is another object of the invention to provide an optically anisotropic element enough advantageously used in an optical compensatory sheet for liquid crystal display to enlarge the viewing angle and to prevent a displayed image from changing chromaticity unfavorably.

The present invention provides the optically anisotropic elements (1) to (15) and the triphenylene compounds (16) to (19), described below.

(1) An optically anisotropic element comprising a discotic compound represented by the following formula (I), wherein the discotic compound has an oriented discotic plane:

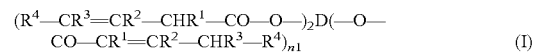

$$(R^4-CR^3=CR^2-CHR^1-CO-O-)_2D(-O-CO-CR^1=CR^2-CHR^3-R^4)_{n1} \qquad (I)$$

in which D is a discotic core; each of n1 and n2 is an integer of 0 to 20 under the condition that n1+n2 is an integer of 3 to 20; each of $R^1$, $R^2$ and $R^3$ is independently hydrogen, a halogen atom, an alkyl group or a substituted alkyl group, or otherwise two of $R^1$, $R^2$ and $R^3$ are combined to form an aliphatic ring; and $R^4$ is an alkyl group, a substituted alkyl group, an alkenyl group, a substituted alkenyl group, an alkoxy group, a substituted alkoxy group, an alkenyloxy group, a substituted alkenyloxy group, an aryl group, a substituted aryl group, an aryloxy group or a substituted aryloxy group.

(2) The optically anisotropic element of (1), wherein D in the formula (I) is triphenylene.

(3) The optically anisotropic element of (1), wherein each of n1 and n2 in the formula (I) is an integer of 0 to 6 under the condition that n1+n2 is 6.

(4) The optically anisotropic element of (1), wherein each of $R^1$, $R^2$ and $R^3$ in the formula (I) is independently hydrogen or methyl.

(5) The optically anisotropic element of (1), wherein $R^4$ in the formula (I) is an aryloxy group or a substituted aryloxy group.

(6) The optically anisotropic element of (1), wherein $R^4$ in the formula (I) is a substituted alkyl group, a substituted alkoxy group, a substituted aryl group or a substituted aryloxy group, and has a substituent group in which a polymerizable group is positioned at the terminal.

(7) The optically anisotropic element of (1), wherein the discotic compound represented by the formula (I) is a discotic liquid crystal compound.

(8) The optically anisotropic element of (1), wherein the discotic plane is oriented to form a discotic nematic phase.

(9) An optically anisotropic element formed by polymerizing a polymerizable discotic compound represented by the following formula (II), wherein the discotic compound has an oriented discotic plane, alignment of said oriented discotic plane being fixed by polymerization:

$$(Q\text{-}L\text{-}CR^3\!=\!CR^2\!-\!CHR^1\!-\!CO\!-\!O\!-\!)_{n2}D(\!-\!O\!-\!CO\!-\!CR^1\!=\!CR^2\!-\!CHR^3\text{-}L\text{-}Q)_{n1} \quad (II)$$

in which D is a discotic core; each of n1 and n2 is an integer of 0 to 12 under the condition that n1+n2 is an integer of 3 to 12; each of $R^1$, $R^2$ and $R^3$ is independently hydrogen, a halogen atom, an alkyl group or a substituted alkyl group, or otherwise two of $R^1$, $R^2$ and $R^3$ are combined to form an aliphatic ring; L is a divalent linking group selected from the group consisting of oxygen atom, carbonyl, an alkylene group, a substituted alkylene group, an arylene group, a substituted arylene group and a combination thereof; and Q is a polymerizable group.

(10) The optically anisotropic element of (9), wherein D in the formula (II) is triphenylene.

(11) The optically anisotropic element of (9), wherein each of n1 and n2 in the formula (II) is an integer of 0 to 6 under the condition that n1+n2 is 6.

(12) The optically anisotropic element of (9), wherein each of $R^1$, $R^2$ and $R^3$ in the formula (II) is independently hydrogen atom or methyl.

(13) The optically anisotropic element of (9), wherein L in the formula (II) is a group represented by —O-AR-$L^2$- in which AR is an arylene group or a substituted arylene group; and $L^2$ is a divalent linking group selected from the group consisting of oxygen atom, carbonyl, an alkylene group, a substituted alkylene group and a combination thereof.

(14) The optically anisotropic element of (9), wherein Q in the formula (II) is an epoxy group or an ethylenically unsaturated group.

(15) The optically anisotropic element of (9), wherein the discotic plane is oriented to form a discotic nematic phase.

(16) A triphenylene compound represented by the following formula (III):

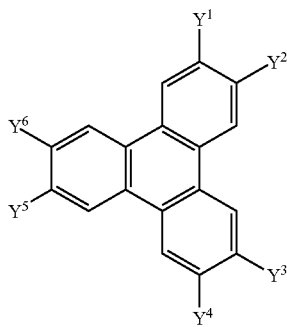

(III)

in which each of $Y^1$, $Y^2$, $Y^3$, $Y^4$, $Y^5$ and $Y^6$ is independently a group represented by —O—CO—$CR^1$=$CR^2$—$CHR^3$—$R^4$ or —O—CO—$CHR^1$—$CR^2$=$CR^3$—$R^4$, wherein each of $R^1$, $R^2$ and $R^3$ is independently hydrogen or methyl; and $R^4$ is an alkyl group having 3 to 20 carbon atoms, a substituted alkyl group having 3 to 20 carbon atoms, an alkenyl group having 3 to 20 carbon atoms, a substituted alkenyl group having 3 to 20 carbon atoms, an alkoxy group having 3 to 20 carbon atoms, a substituted alkoxy group having 3 to 20 carbon atoms, an alkenyloxy group having 3 to 20 carbon atoms, a substituted alkenyloxy group having 3 to 20 carbon atoms, an aryl group having 6 to 20 carbon atoms, a substituted aryl group having 6 to 20 carbon atoms, an aryloxy group having 6 to 20 carbon atoms, or a substituted aryloxy group having 6 to 20 carbon atoms.

(17) The triphenylene compound of (16), wherein $R^4$ in the formula (III) is an aryloxy group having 6 to 20 carbon atoms or a substituted aryloxy group having 6 to 20 carbon atoms.

(18) The triphenylene compound of (16), wherein $R^4$ in the formula (III) is a substituted alkyl group having 3 to 20 carbon atoms, a substituted alkoxy group having 3 to 20 carbon atoms, a substituted aryl group having 6 to 20 carbon atoms or a substituted aryloxy group having 6 to 20 carbon atoms, and has a substituent group in which a polymerizable group is positioned at the terminal.

(19) The triphenylene compound of (18), wherein the polymerizable group is an epoxy group or an ethylenically unsaturated group.

The optically anisotropic element according to the invention is useful as an optically anisotropic layer. The discotic compound defined by the formula (I) behaves as liquid crystal either singly or in the presence of other additives. The molecules of the discotic compound can be so aligned that the formed optically anisotropic layer has large birefringent anisotropy but gives small wavelength dispersion. This means, if equipped with a phase retarder comprising the discotic compound of the formula (I), a liquid crystal display gives an image less suffering unfavorable chromaticity-change and has an enlarged viewing angle. Further, even if thin, the optically anisotropic layer formed from the discotic compound of the formula (I) can be made to have enough retardation to produce a thin liquid crystal display.

The triphenylene compound represented by the above formula (III) is preferably used as the discotic compound of the formula (I). If the triphenylene compound of the formula (III) is used, with regard to the above matters, remarkable effects are obtained.

DETAILED DESCRIPTION OF THE INVENTION

[Discotic Compound]

In the present invention, a discotic compound represented by the following formula (I) is used.

$$(R^4\!-\!CR^3\!=\!CR^2\!-\!CHR^1\!-\!CO\!-\!O\!-\!)_{n2}D(\!-\!O\!-\!CO\!-\!CR^1\!=\!CR^2\!-\!CHR^3\!-\!R^4)_{n1} \quad (I)$$

In the formula (I), D is a discotic core. The discotic core is positioned at the center of the molecular structure, and is a part serving as the discotic plane of discotic molecule. The discotic core is a well-known concept of the molecular structure of a discotic liquid crystal compound. The discotic liquid crystal is described in various documents, such as C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994).

Examples of the discotic cores (D) are shown below. In the following examples, Y is a group represented by —O—CO—CR$^1$=CR$^2$—CHR$^3$—R$^4$ or —O—CO—CHR$^1$—CR$^2$=CR$^3$—R$^4$.

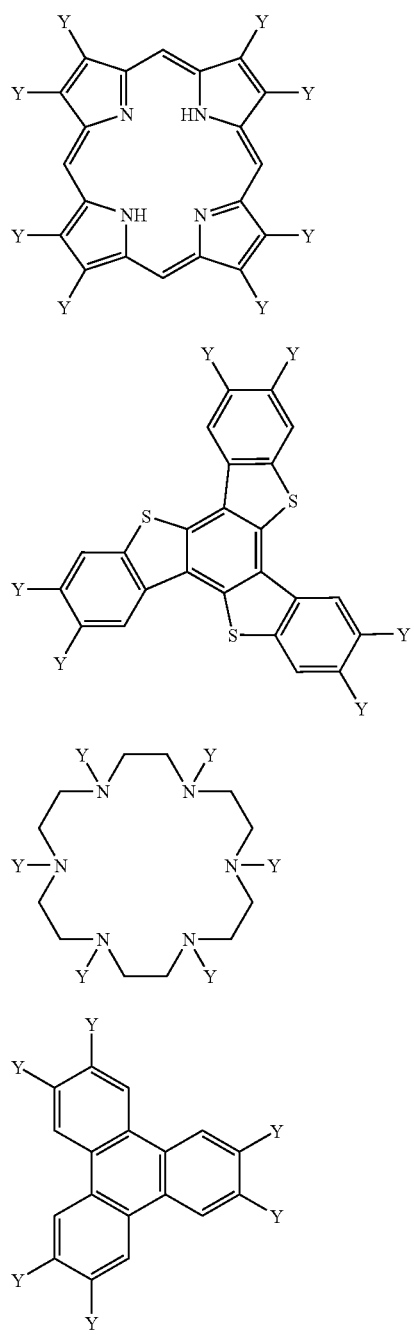

-continued

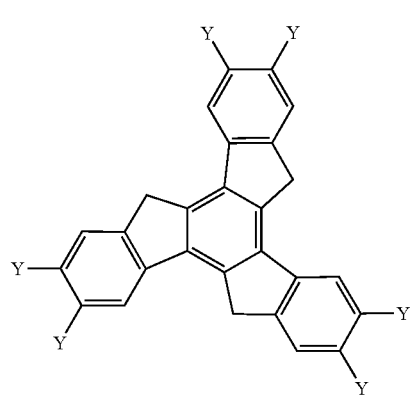

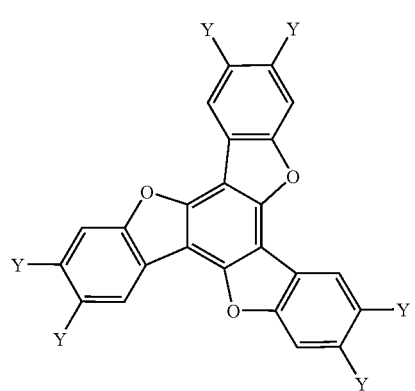

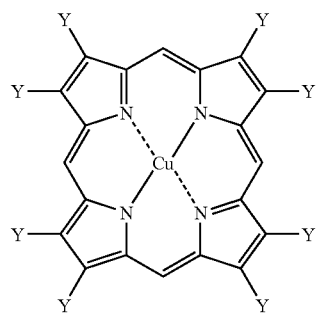

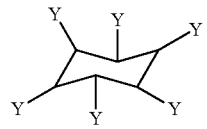

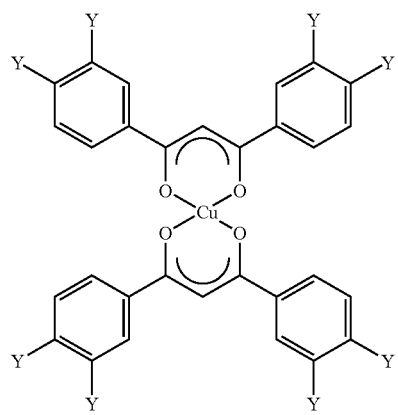

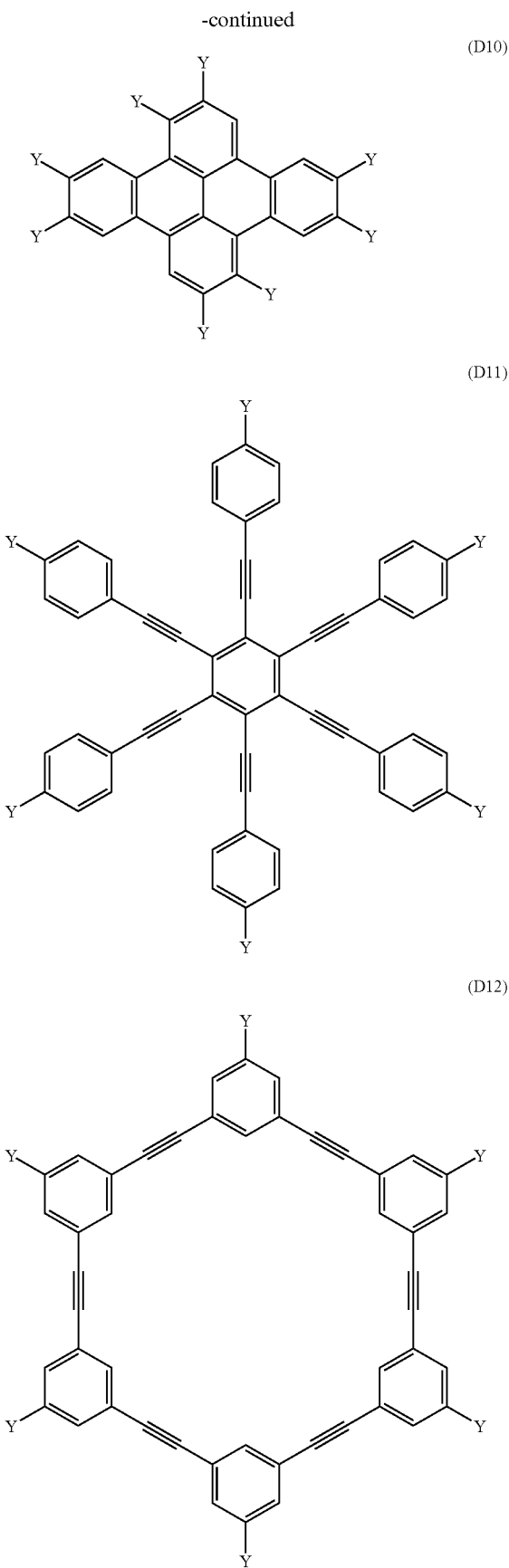

The discotic core (D) is preferably triphenylene (D4).

The discotic core (D) may have a substituent group other than Y(—O—CO—CR$^1$═CR$^2$—CHR$^3$—R$^4$ or —O—CO—CHR$^1$—CR$^2$═CR$^3$—R$^4$).

Examples of the substituent groups include a halogen atom (fluorine, chlorine, bromine, iodine), cyano, hydroxyl, amino, carbamoyl, sulfamoyl, mercapto, ureido, an alkyl group, a substituted alkyl group, an alkenyl group, a substituted alkenyl group, an alkynyl group, a substituted alkynyl group, an aryl group, a substituted aryl group, a heterocyclic group, an alkoxy group, a substituted alkoxy group, an aryloxy group, a substituted aryloxy group, an acyl group, an acyloxy group, an alkoxycarbonyl group, a substituted alkoxycarbonyl group, an aryloxycarbonyl group, a substituted aryloxycarbonyl group, a substituted amino group, an amido group, an imido group, an alkoxycarbonylamino group, a substituted alkoxycarbonylamino group, an alkoxycarbonylamino group, a substituted alkoxycarbonylamino group, a substituted carbamoyl group, a sulfonamido group, a substituted sulfamoyl group, an alkylthio group, a substituted alkylthio group, an arylthio group, a substituted arylthio group, an alkylsulfonyl group, a substituted alkylsulfonyl group, an arylsulfonyl group, a substituted arylsulfonyl group, an alkylsulfinyl group, a substituted alkylsulfinyl group, an arylsulfinyl group, a substituted arylsulfinyl group, a substituted ureido group, a phosphoric amido group, and a substituted silyl group.

The alkyl group can have a cyclic or branched structure. The alkyl group preferably has 1 to 30 carbon atoms.

The alkyl moiety of the substituted alkyl group is the same as the alkyl group. Examples of the substituent group of the substituted alkyl group are the same as those of the discotic core except an alkyl group, a substituted alkyl group, an alkenyl group, a substituted alkenyl group, an alkynyl group and a substituted alkynyl group.

The alkenyl group can have a cyclic or branched structure. The alkenyl group has preferably 2 to 30 carbon atoms.

The alkenyl moiety of the substituted alkenyl group is the same as the alkenyl group. Examples of the substituent group of the substituted alkenyl group are the same as those of the substituted alkyl group.

The alkynyl group can have a cyclic or branched structure. The alkynyl group has preferably 2 to 30 carbon atoms.

The alkynyl moiety of the substituted alkynyl group is the same as the alkynyl group. Examples of the substituent group of the substituted alkynyl group are the same as those of the substituted alkyl group.

The aryl group has preferably 6 to 30 carbon atoms.

The aryl moiety of the substituted aryl group is the same as the aryl group. Examples of the substituent group of the substituted aryl group are the same as those of the discotic core.

The heterocyclic group preferably has a 5- or 6-membered heterocyclic ring. The heterocyclic ring can be condensed with another heterocyclic ring, an aliphatic ring or an aromatic ring. The heteroatom of the heterocyclic ring is preferably nitrogen, oxygen or sulfur. The heterocyclic group may have a substituent group. Examples of the substituent group of the heterocyclic group are the same as those of the discotic core.

The alkyl moiety of the alkoxy group or the substituted alkoxy group is the same as the alkyl group. Examples of the substituent group of the substituted alkoxy group are the same as those of the substituted alkyl group.

The aryl moiety of the aryloxy group or the substituted aryloxy group is the same as the aryl group. Examples of the substituent group of the substituted aryloxy group are the same as those of the discotic core.

The acyl group is formyl or a group represented by —CO—R in which R is an alkyl group, a substituted alkyl group, an alkenyl group, a substituted alkenyl group, an alkynyl group, a substituted alkynyl group, an aryl group or a substituted aryl group.

The acyloxy group is formyloxy or a group represented by —O—CO—R in which R is an alkyl group, a substituted alkyl group, an alkenyl group, a substituted alkenyl group, an alkynyl group, a substituted alkynyl group, an aryl group or a substituted aryl group.

The alkyl moiety of the alkoxycarbonyl group or the substituted alkoxycarbonyl group is the same as the alkyl group. Examples of the substituent group of the substituted alkoxycarbonyl group are the same as those of the substituted alkyl group.

The aryl moiety of the aryloxycarbonyl group or the substituted aryloxycarbonyl group is the same as the aryl group. Examples of the substituent group of the substituted aryloxycarbonyl group are the same as those of the discotic core.

The substituted amino group is represented by —NH—R or —N(—R)$_2$ in which R is an alkyl group, a substituted alkyl group, an alkenyl group, a substituted alkenyl group, an alkynyl group, a substituted alkynyl group, an aryl group or a substituted aryl group.

The amido group is represented by —NH—CO—R in which R is an alkyl group, a substituted alkyl group, an alkenyl group, a substituted alkenyl group, an alkynyl group, a substituted alkynyl group, an aryl group or a substituted aryl group.

The imido group is represented by —N(—CO—R)$_2$ in which R is an alkyl group, a substituted alkyl group, an alkenyl group, a substituted alkenyl group, an alkynyl group, a substituted alkynyl group, an aryl group or a substituted aryl group.

The alkyl moiety of the alkoxycarbonylamino group or the substituted alkoxycarbonylamino group is the same as the alkyl group. Examples of the substituent group of the substituted alkoxycarbonylamino group are the same as those of the substituted alkyl group.

The aryl moiety of the alkoxycarbonylamino group or the substituted alkoxycarbonylamino group is the same as the aryl group. Examples of the substituent group of the substituted alkoxycarbonylamino group are the same as those of the discotic core.

The substituted carbamoyl group is represented by —CO—NH—R or —CO—N(—R)$_2$ in which R is an alkyl group, a substituted alkyl group, an alkenyl group, a substituted alkenyl group, an alkynyl group, a substituted alkynyl group, an aryl group or a substituted aryl group.

The sulfonamido group is represented by —NH—SO$_2$—R in which R is an alkyl group, a substituted alkyl group, an alkenyl group, a substituted alkenyl group, an alkynyl group, a substituted alkynyl group, an aryl group or a substituted aryl group.

The substituted sulfamoyl group is represented by —SO$_2$—NH—R or —SO$_2$—N(—R)$_2$ in which R is an alkyl group, a substituted alkyl group, an alkenyl group, a substituted alkenyl group, an alkynyl group, a substituted alkynyl group, an aryl group or a substituted aryl group.

The alkyl moiety of the alkylthio group or the substituted alkylthio group is the same as the alkyl group. Examples of the substituent group of the substituted alkylthio group are the same as those of the substituted alkyl group.

The aryl moiety of the arylthio group or the substituted arylthio group is the same as the aryl group. Examples of the substituent group of the substituted arylthio group are the same as those of the discotic core.

The alkyl moiety of the alkylsulfonyl group or the substituted alkylsulfonyl group is the same as the alkyl group. Examples of the substituent group of the substituted alkylsulfonyl group are the same as those of the substituted alkyl group.

The aryl moiety of the arylsulfonyl group or the substituted arylsulfonyl group is the same as the aryl group. Examples of the substituent group of the substituted arylsulfonyl group are the same as those of the discotic core.

The alkyl moiety of the alkylsulfinyl group or the substituted alkylsulfinyl group is the same as the alkyl group. Examples of the substituent group of the substituted alkylsulfinyl group are the same as those of the substituted alkyl group.

The aryl moiety of the arylsulfinyl group or the substituted arylsulfinyl group is the same as the aryl group. Examples of the substituent group of the substituted arylsulfinyl group are the same as those of the discotic core.

The substituted ureido group is represented by —NH—CO—NH—R or —NH—CO—N(—R)$_2$ in which R is an alkyl group, a substituted alkyl group, an alkenyl group, a substituted alkenyl group, an alkynyl group, a substituted alkynyl group, an aryl group or a substituted aryl group.

The phosphoric amido group is represented by —NH—O—P(=O)(—OH)—O—R or —NH—O—P(=O)(—O—R)$_2$ in which R is an alkyl group, a substituted alkyl group, an alkenyl group, a substituted alkenyl group, an alkynyl group, a substituted alkynyl group, an aryl group or a substituted aryl group.

The substituted silyl group is represented by —SiH$_2$—R, —SiH(—R)$_2$ or —Si(—R)$_3$ in which R is an alkyl group, a substituted alkyl group, an alkenyl group, a substituted alkenyl group, an alkynyl group, a substituted alkynyl group, an aryl group or a substituted aryl group.

In the formula (I), each of n1 and n2 is an integer of 0 to 20 under the condition that n1+n2 is an integer of 3 to 20. The n1+n2 is an integer of preferably 3 to 15, more preferably 3 to 12, further preferably 3 to 10, furthermore preferably 4 to 8, and most preferably 6.

In the formula (I), each of $R^1$, $R^2$ and $R^3$ is independently hydrogen, a halogen atom, an alkyl group or a substituted alkyl group, or otherwise two of $R^1$, $R^2$ and $R^3$ are combined to form an aliphatic ring. Description of the alkyl group and the substituted alkyl group given above for the discotic core can be also applied for the above groups.

Each of $R^1$, $R^2$ and $R^3$ is preferably independently hydrogen, a halogen atom, an alkyl group or a substituted alkyl group, rather than two of them are combined to form an aliphatic ring. Each of $R^1$, $R^2$ and $R^3$ is independently more preferably hydrogen, a halogen atom, an alkyl group having 1 to 30 carbon atoms or a substituted alkyl group having 1 to 30, further preferably hydrogen, a halogen atom or an alkyl group having 1 to 30 carbon atoms, furthermore preferably hydrogen, a halogen atom or an alkyl group having 1 to 6 carbon atoms, still further preferably hydrogen or methyl, and most preferably hydrogen.

The double bonds in the formula (I) are preferably in a trans-form rather than in a cis-form.

In the formula (I), —O—CO—$CR^1$=$CR^2$—$CHR^3$—$R^4$ is preferred to —O—CO—$CHR^1$—$CR^2$=$CR^3$—$R^4$.

In the case where the formula (I) has two or more groups represented by —O—CO—$CR^1$=$CR^2$—$CHR^3$—$R^4$, they may be different from each other. If the formula (I) has two or more groups represented by —O—CO—$CHR^1$—$CR^2$=$CR^3$—$R^4$, they may be different from each other.

In the formula (I), $R^4$ is an alkyl group, a substituted alkyl group, an alkenyl group, a substituted alkenyl group, an alkoxy group, a substituted alkoxy group, an alkenyloxy group, a substituted alkenyloxy group, an aryl group, a substituted aryl group, an aryloxy group or a substituted aryloxy group.

The alkyl group, the substituted alkyl group, the alkenyl group, the substituted alkenyl group, the alkoxy group, the substituted alkoxy group, the aryl group, the substituted aryl group, the aryloxy group and the substituted aryloxy group are the same as the groups described as the substituent groups of the discotic core.

The alkenyl moiety of the alkenyloxy group the substituted alkenyloxy group is the same as the alkenyl group described above as the substituent group of the discotic core. Examples of the substituent group of the substituted alkenyl group are the same as those of the substituted alkyl group described above as the substituent group of the discotic core.

Preferably, $R^4$ is an aryloxy group or a substituted aryloxy group.

The discotic compound represented by the formula (I) can have a polymerizable group. The discotic compound having a polymerizable group (polymerizable discotic compound) can be polymerized to fix molecules thereof aligned so that their discotic planes are oriented, and thereby the orientation can be fixed.

In the case where the compound of the formula (I) has a polymerizable group, $R^4$ is preferably a substituted alkyl group, a substituted alkoxy group, a substituted aryl group or a substituted aryloxy group, and preferably has a substituent group in which a polymerizable group is positioned at the terminal.

The polymerizable discotic compound is preferably represented by the following formula (II).

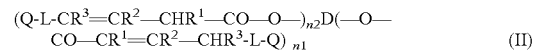

$$(Q\text{-L-}CR^3{=}CR^2{-}CHR^1{-}CO{-}O{-})_{n2}D({-}O{-}CO{-}CR^1{=}CR^2{-}CHR^3\text{-L-Q})_{n1} \qquad (II)$$

In the formula (II), D is a discotic core.

In the formula (II), each of n1 and n2 is an integer of 0 to 12 under the condition that n1+n2 is an integer of 3 to 12.

In the formula (II), each of $R^1$, $R^2$ and $R^3$ is independently hydrogen atom, a halogen atom, an alkyl group or a substituted alkyl group; or otherwise two of $R^1$, $R^2$ and $R^3$ are combined to form an aliphatic ring.

These D, n1, n2, $R^1$, $R^2$ and $R^3$ are the same as those defined in the formula (I).

In the formula (II), L is a divalent linking group selected from the group consisting of oxygen atom, carbonyl, an alkylene group, a substituted alkylene group, an arylene group, a substituted arylene group and a combination thereof.

The alkylene group can have a cyclic or branched structure. The alkylene group preferably has 1 to 30 carbon atoms.

The alkylene moiety of the substituted alkylene group is the same as the alkylene group. Examples of the substituent group of the substituted alkylene group are the same as those of the discotic core in the formula (I) except for an alkyl group, a substituted alkyl group, an alkenyl group, a substituted alkenyl group, an alkynyl group and a substituted alkynyl group.

The arylene group preferably has 6 to 30 carbon atoms. The arylene group is preferably phenylene or naphthylene, more preferably naphthylene, and most preferably p-naphthylene.

The arylene moiety of the substituted arylene group is the same as the arylene group. Examples of the substituent group of the substituted arylene group are the same as those of the discotic core in the formula (I).

The linking group L is preferably represented by —O—AR-$L^2$- (in which the left side is attached to $CR^3$ and the right side is attached to Q). AR is an arylene group or a substituted arylene group. $L^2$ is a divalent linking group selected from the group consisting of oxygen atom, carbonyl, an alkylene group, a substituted alkylene group and a combination thereof.

Examples of the divalent linking group L are shown below. In the following examples, AL stands for an alkylene group or an alkenylene group, and AR stands for an arylene group or a substituted arylene group. The left side is attached to $CR^3$, and the right side is attached to Q.

L1: —O-AR-O-AL-O—CO—

L2: —O-AR-O-AL-

L3: —O-AR-CO—O-AL-O—CO—

In the formula (II), Q is a polymerizable group.

The polymerizable group is preferably epoxy or an unsaturated group, more preferably epoxy or an ethylenically unsaturated group, most preferably an ethylenically unsaturated group (e.g., vinyl, 1-propenyl, isopropenyl).

A preferred discotic compound is the triphenylene compound represented by the following formula (III).

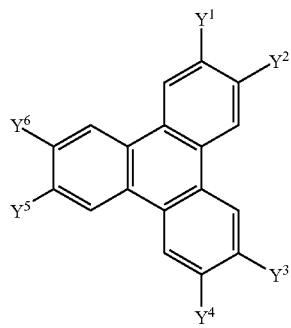

(III)

In the formula (III), each of $Y^1$, $Y^2$, $Y^3$, $Y^4$, $Y^5$ and $Y^6$ is independently a group represented by —O—CO—$CR^1$=$CR^2$—$CHR^3$—$R^4$ or —O—CO—$CHR^1CR^2$=$CR^3$—$R^4$. Each of $R^1$, $R^2$ and $R^3$ is independently hydrogen atom or methyl.

In the formula (III), $R^4$ is an alkyl group having 3 to 20 carbon atoms, a substituted alkyl group having 3 to 20 carbon atoms, an alkenyl group having 3 to 20 carbon atoms, a substituted alkenyl group having 3 to 20 carbon atoms, an alkoxy group having 3 to 20 carbon atoms, a substituted alkoxy group having 3 to 20 carbon atoms, an alkenyloxy group having 3 to 20 carbon atoms, a substituted alkenyloxy group having 3 to 20 carbon atoms, an aryl group having 6 to 20 carbon atoms, a substituted aryl group having 6 to 20 carbon atoms, an aryloxy group having 6 to 20 carbon atoms, or a substituted aryloxy group having 6 to 20 carbon atoms. Definition and examples of these groups are the same as those described for the formula (I).

The group of $R^4$ is preferably an aryloxy group having 6 to 20 carbon atoms or a substituted aryloxy group having 6 to 20 carbon atoms.

The triphenylene compound of the formula (III) can have a polymerizable group. The triphenylene compound having a polymerizable group (polymerizable triphenylene compound) can be polymerized to fix molecules thereof aligned so that their discotic planes of triphenylene are oriented, and thereby the orientation can be fixed.

In the case where the triphenylene compound of the formula (III) has a polymerizable group, $R^4$ is preferably a substituted alkyl group having 3 to 20 carbon atoms, a substituted alkoxy group having 3 to 20 carbon atoms, a substituted aryl group having 6 to 20 carbon atoms or a substituted aryloxy group having 6 to 20 carbon atoms, and preferably has a substituent group in which a polymerizable group is positioned at the terminal. It is preferred that each of $Y^1$, $Y^2$, $Y^3$, $Y^4$, $Y^5$ and $Y^6$ is independently a group represented by —O—CO—$CR^1$=$CR^2$—$CHR^3$-L-Q or —O—CO—$CHR^1$—$CR^2$=$CR^3$-L-Q. L is represented by —O-AR-$L^2$- (in which the left side is attached to $CR^3$ and the right side is attached to Q). In the formula, AR is an arylene group having 6 to 20 carbon atoms or a substituted arylene group having 6 to 20 carbon atoms, and $L^2$ is preferably a divalent linking group selected from the group consisting of oxygen atom, carbonyl, an alkylene group having 3 to 20 carbon atoms, a substituted alkylene group having 3 to 20 carbon atoms and a combination thereof.

Examples of the divalent linking group L are the same as those of the formula (II).

In the above formula, Q is a polymerizable group.

The polymerizable group is preferably epoxy or an unsaturated group, more preferably epoxy or an ethylenically unsaturated group, most preferably an ethylenically unsaturated group (e.g., vinyl, 1-propenyl, isopropenyl).

Examples of the discotic compounds represented by the formula (I) are shown below.

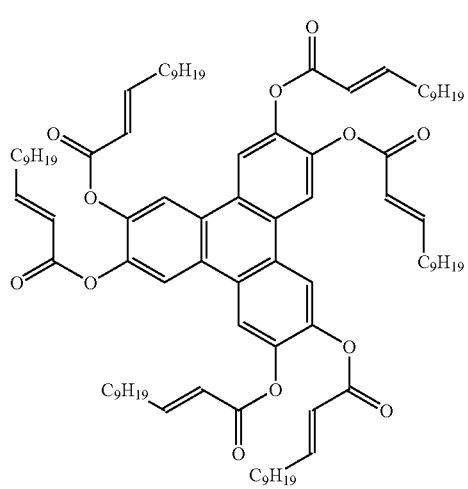

(1)

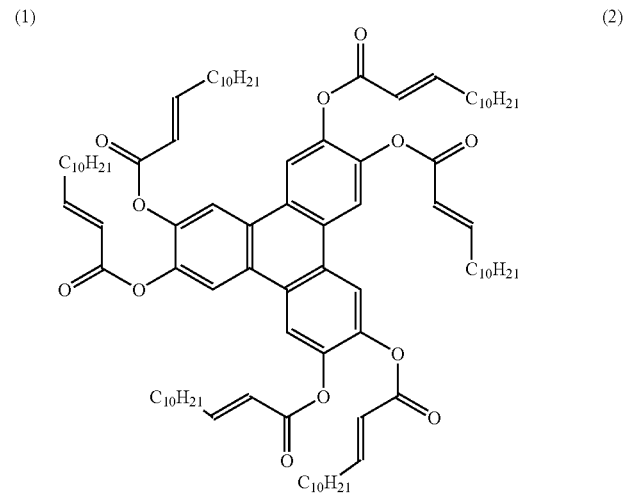

(2)

-continued
(3)
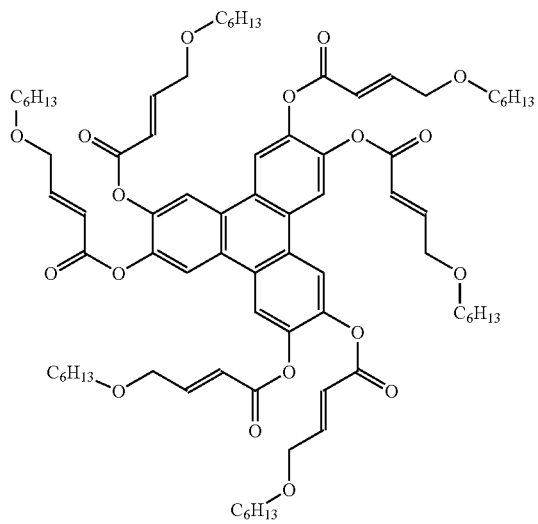
(4)
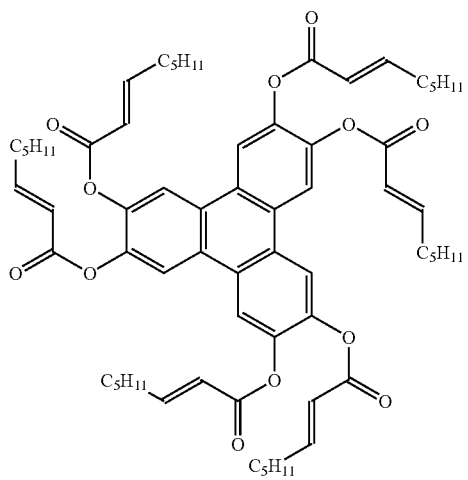
(5)
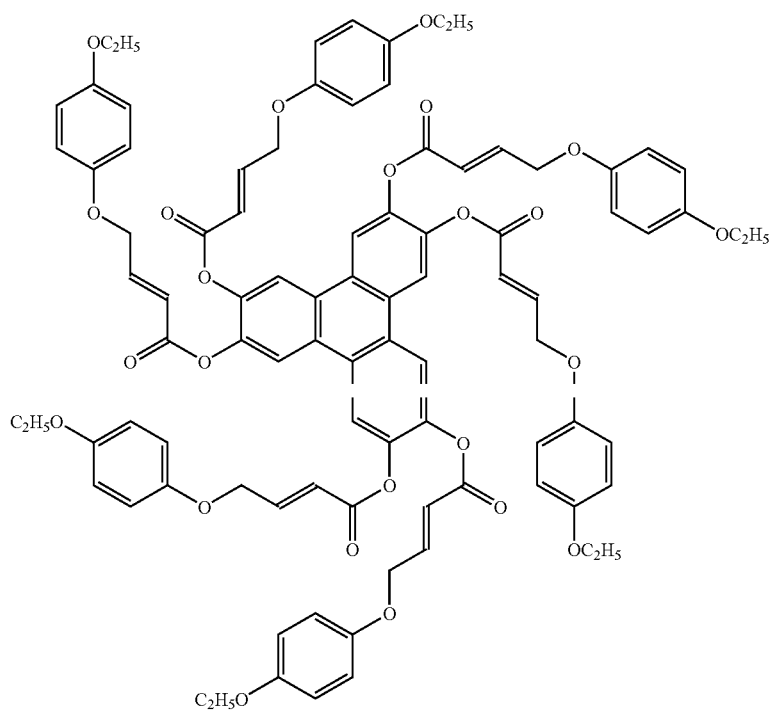
(6)
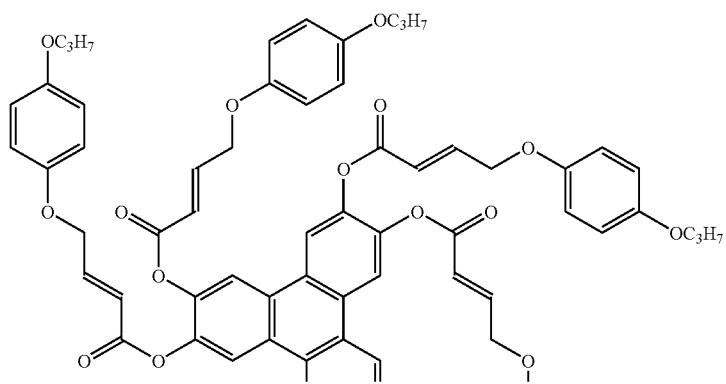

-continued
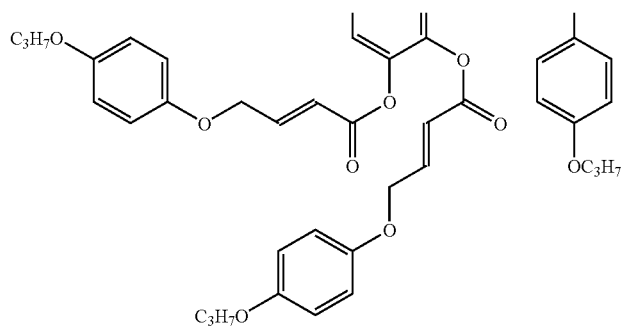
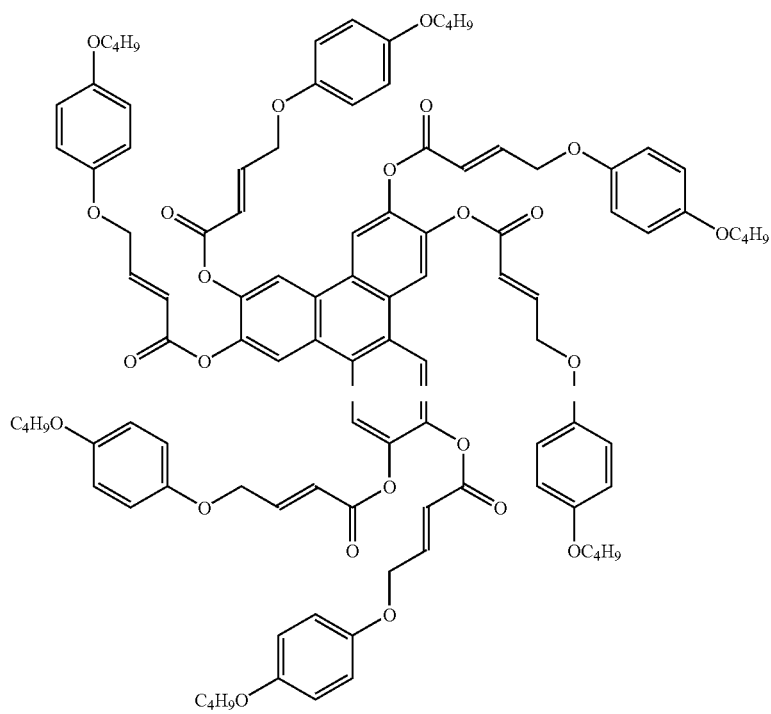
(7)
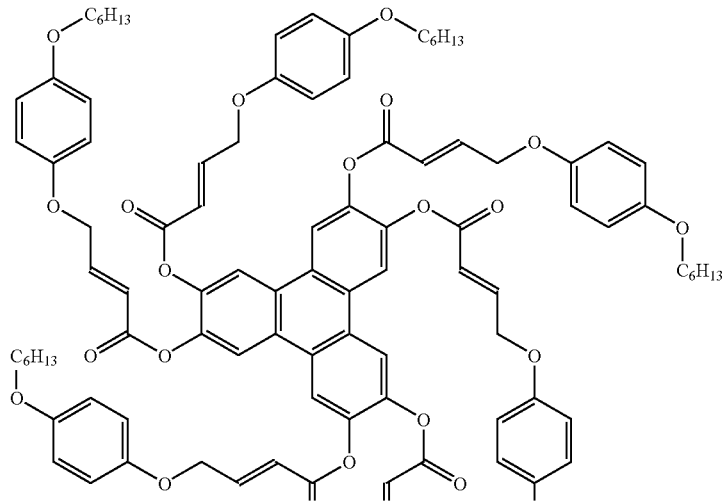
(8)

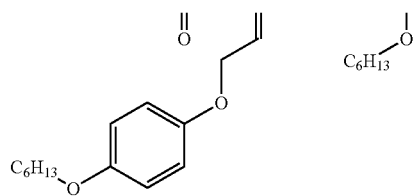
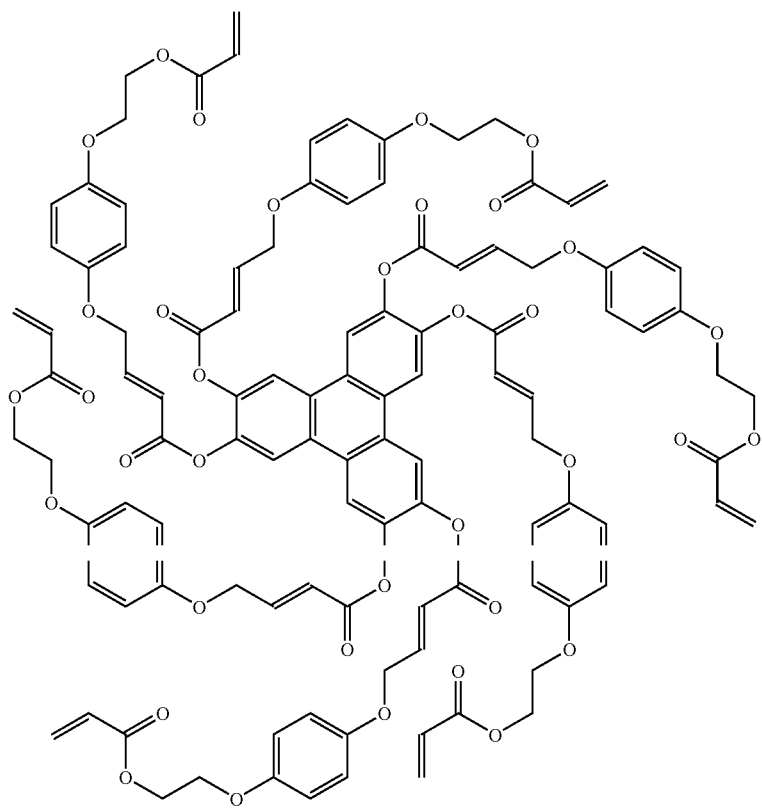
(9)
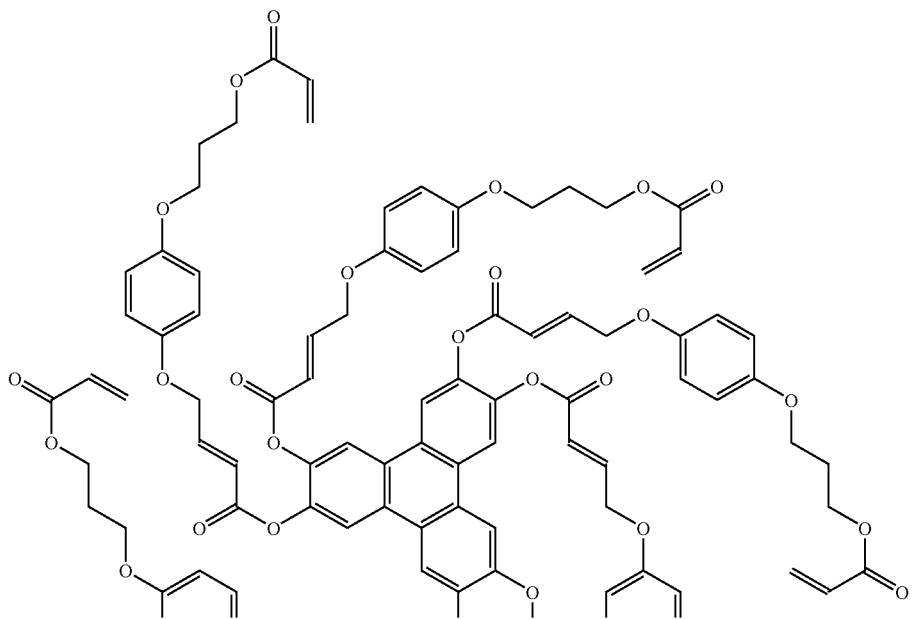
(10)

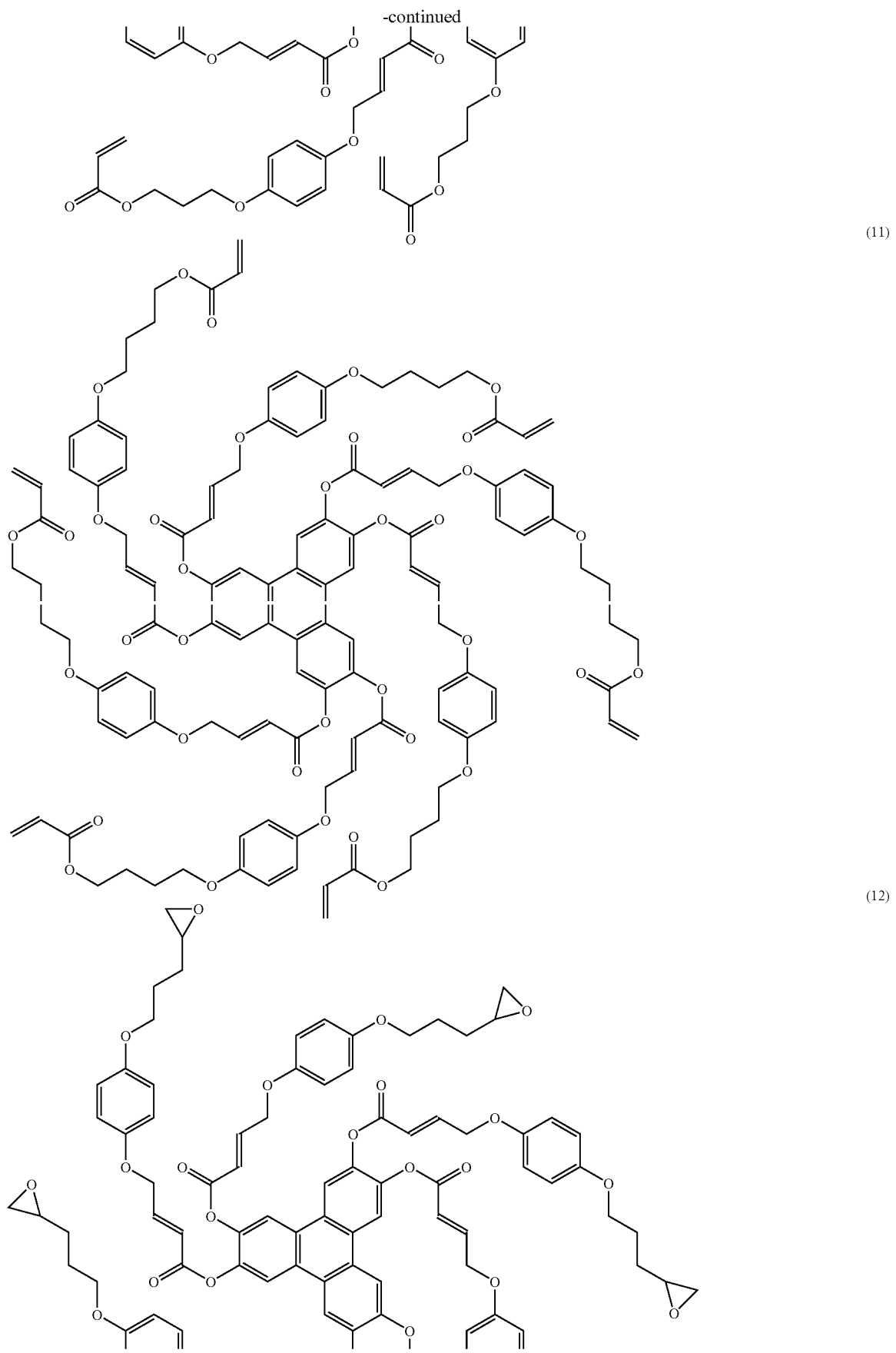
(11)
(12)

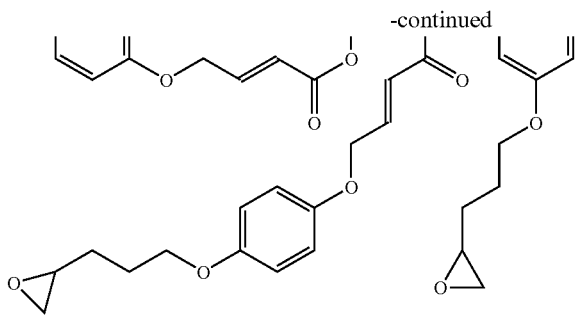
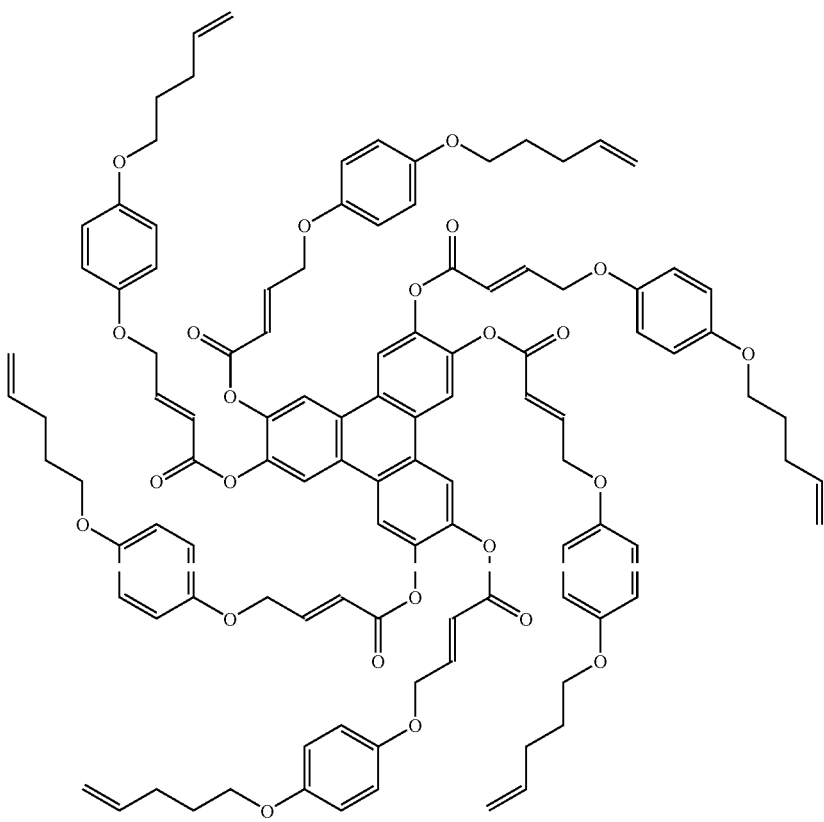
(13)
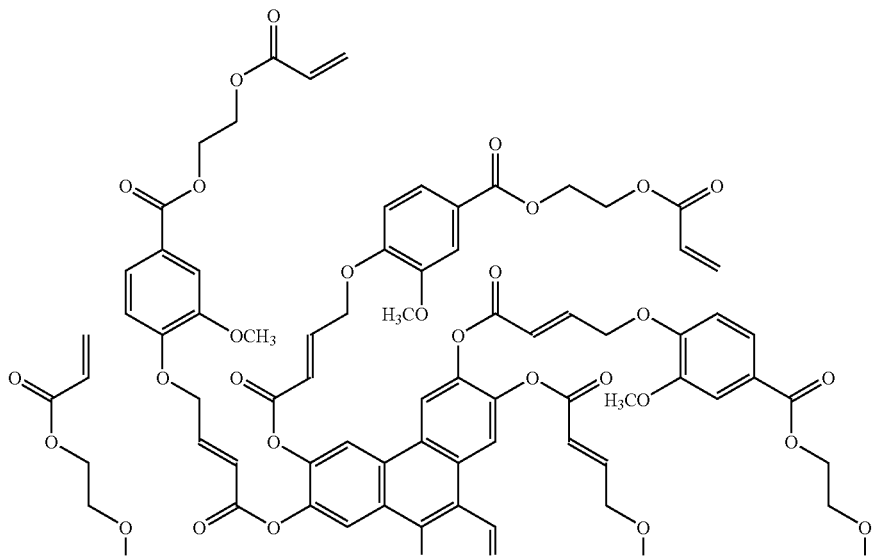
(14)

-continued
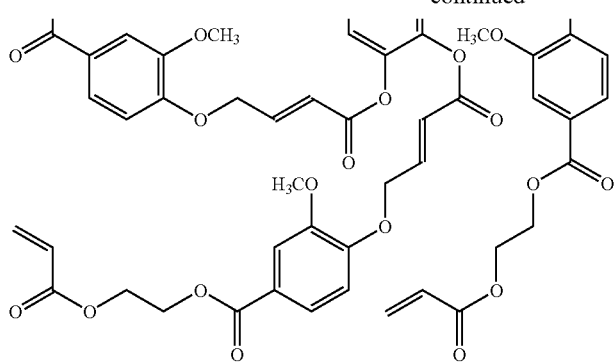
(15)
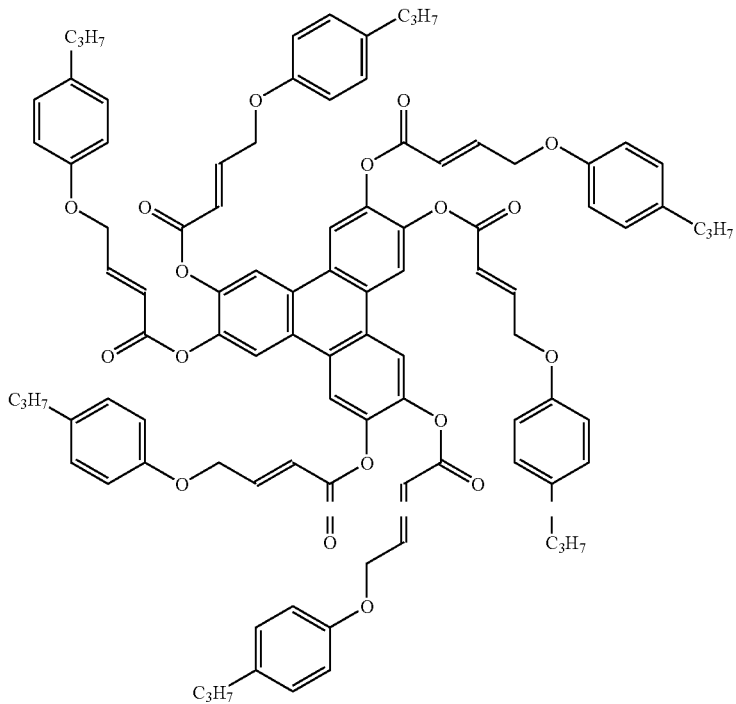
(16)
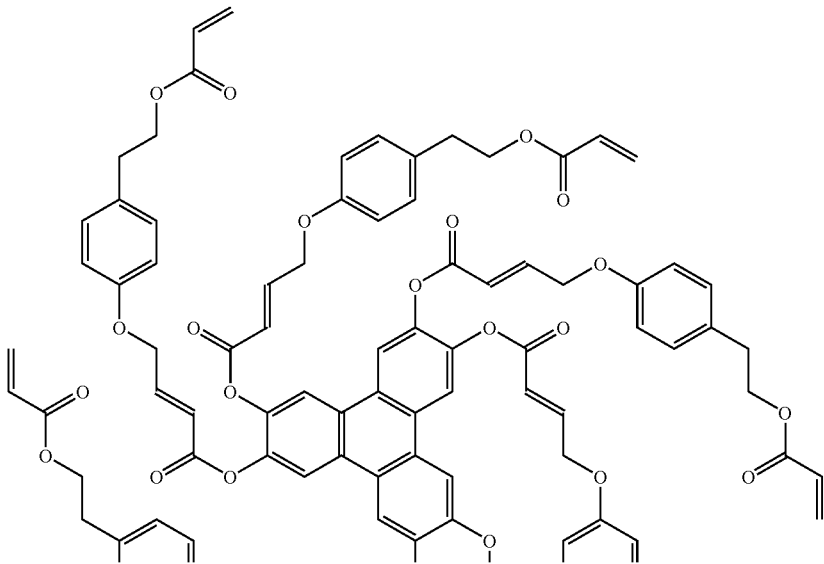

-continued

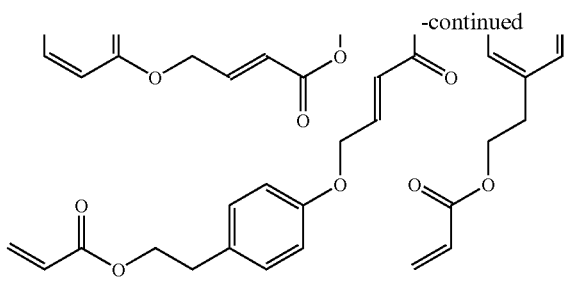

The discotic compound represented by the formula (I) can be prepared in the manner similar to the following synthesis examples.

SYNTHESIS EXAMPLE 1

The compound (1) was synthesized according to the following reaction formula. The phase transition temperature was determined by observation with a polarizing microscope. In the following Synthesis Examples 2-9, the phase transition temperatures were determined in the same manner.

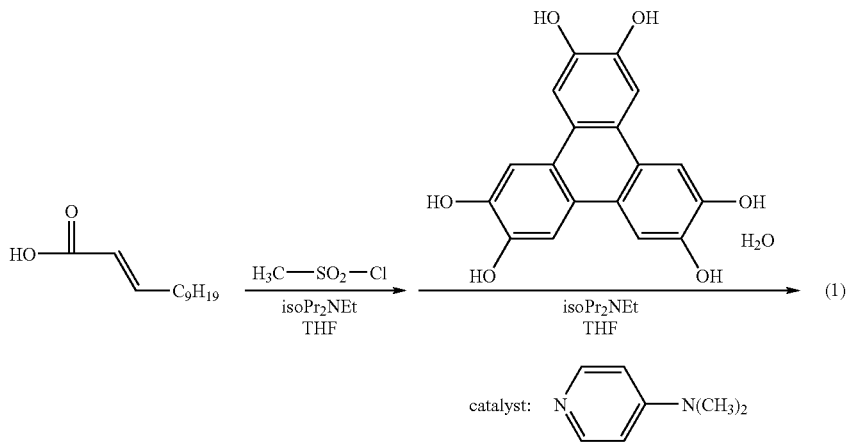

Under nitrogen gas atmosphere, 5.7 g (50.0 mmol) of methanesulfonyl chloride was added to 100 ml of tetrahydrofuran solution containing 9.9 g (50.0 mmol) of trans-2-dodecenecarboxylic acid while cooled with ice, and then 6.5 g (50.0 mmol) of ethyldiisopropylamine was slowly dropped into the mixture. The solution was heated to room temperature, and stirred for 30 minutes. After the reaction was confirmed with TLC, 50 ml of tetrahydrofuran solution containing 1.71 g (5.0 mmol) of 2,3,6,7,10,11-hexahydroxytriphenylene monohydrate was added to the solution while cooled with ice. To the resultant solution, 4.5 g (35.0 mmol) of ethyldiisopropylamine was slowly dropped. After a catalytic amount of N,N-dimethylaminopyridine was added, the solution was heated to room temperature and stirred for 3 hours. Water and ethyl acetate were added, and the organic portion was collected and washed with diluted hydrochloric acid and saturated aqueous solution of sodium chloride. After the organic portion was dried with magnesium sulfate anhydride, the solvent was distilled away under reduced pressure. The residue was purified through a silica-gel column chromatography (eluting solvent: mixture of ethyl acetate and hexane), to obtain 6.2 g (yield: 88%) of the compound (1).

$^1$H NMR (400 MHz, CDCl$_3$) δ0.90 (18H, t, J=6.80 Hz), 1.20-1.60 (84H, m), 2.29 (12H, q, J=6.80 Hz), 6.03 (6H, d, J=15.6 Hz), 7.20 (6H, d, t, J=15.6 Hz, 6.8 Hz), 8.30 (6H, s); Mass spectrum (M+Na)/(POSI)=1427; phase transition temperature: N$_D$-60° C.-Iso

SYNTHESIS EXAMPLE 2

The procedures of Synthesis Example 1 were repeated except that the same molar amount of trans-2-tridecenoic acid was used in place of trans-2-dodecenecarboxylic acid, to prepare the compound (2) [yield: 80%].

$^1$H NMR (400 MHz, CDCl$_3$) δ0.88 (18H, t, J=6.80 Hz), 1.20-1.60 (96H, m), 2.29 (12H, q, J=6.80 Hz), 6.03 (6H, d, J=15.6 Hz), 7.22 (6H, d, t, J=15.6 Hz, 6.8 Hz), 8.30 (6H, s); Mass spectrum (M+Na)/(POSI)=1513; phase transition temperature: N$_D$-45° C.-Iso

SYNTHESIS EXAMPLE 3

The procedures of Synthesis Example 1 were repeated except that the same molar amount of trans-2-octenoic acid was used in place of trans-2-dodecenecarboxylic acid, to prepare the compound (4) [yield: 92%].

$^1$H NMR (400 MHz, CDCl$_3$) δ0.91 (18H, t, J=6.80 Hz), 1.25-1.60 (84H, m), 2.29 (12H, q, J=6.80 Hz), 6.03 (6H, d, J=15.6 Hz), 7.22 (6H, d, t, J=15.6 Hz, 6.8 Hz), 8.31 (6H, s); Mass spectrum (M+Na)/(POSI)=1092; phase transition temperature*: C-141° C.-Iso-132° C.-Col Remark (*): The compound behaved as liquid crystal only while the temperature is decreasing.

SYNTHESIS EXAMPLE 4

The compound (7) was synthesized according to the following reaction formula.

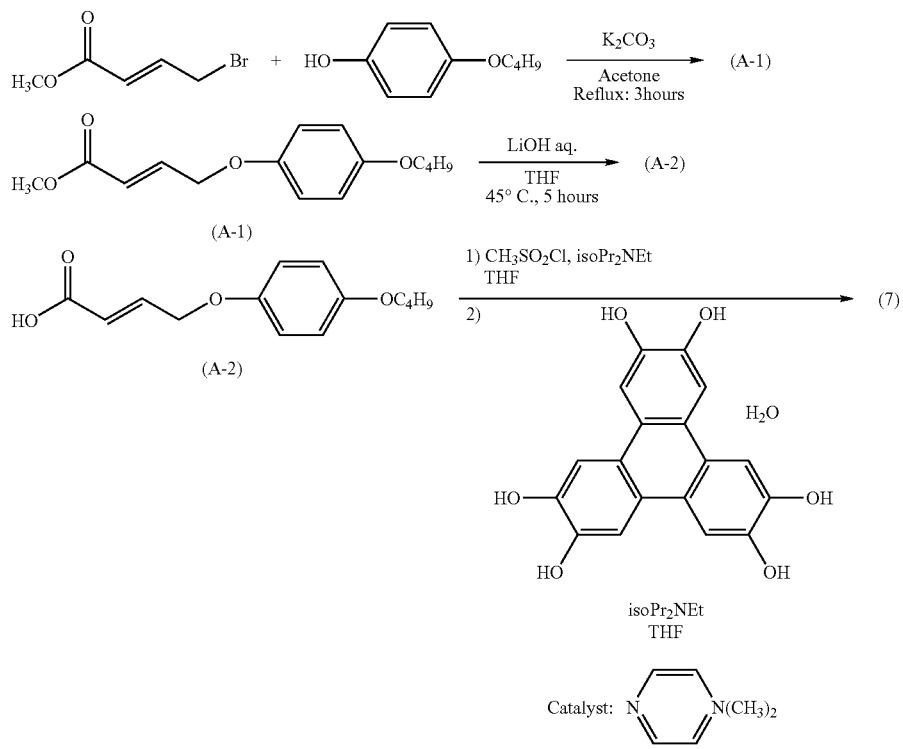

After 700 ml of acetone solution containing 37.9 g (0.18 mol) of methyl 4-bromocrotonate (85%), 24.9 g (0.15 mol) of 4-butoxyphenol and 41.5 g (0.3 mol) of calcium carbonate was stirred, heated and refluxed for 5 hours, the calcium carbonate was filtered off. The solvent was distilled away under reduced pressure, and then water and ethyl acetate were added. The organic portion was collected and washed with diluted hydrochloric acid and saturated aqueous solution of sodium chloride. After the organic portion was dried with magnesium sulfate anhydride, the solvent was distilled away under reduced pressure. The residue was purified through a silica-gel column chromatography (eluting solvent: mixture of ethyl acetate and hexane), to obtain 32.9 g of the compound (A-1) [yield: 83%].

To 300 ml of tetrahydrofuran solution containing 26.4 g (0.1 mol) of the compound (A-1), 240 ml of aqueous solution containing 8.6 g (0.2 mol) of lithium hydroxide monohydrate was added. After 50 ml of methanol was added, the solution was heated to 45° C. and stirred for 5 hours. The solution was then neutralized with diluted hydrochloric acid, and water and ethyl acetate were added. The organic portion was collected and washed with diluted hydrochloric acid and saturated aqueous solution of sodium chloride. After the organic portion was dried with magnesium sulfate anhydride, the solvent was distilled away under reduced pressure. From the residue, 21.8 g of the compound (A-2) [yield: 87%] was crystallized in a mixed solvent of ethyl acetate and hexane.

While chilled with ice, 5.7 g (50.0 mmol) of methanesulfonyl chloride was added to 250 ml of tetrahydrofuran solution containing 12.5 g (50.0 mmol) of the compound (A-2), and then 6.5 g (50.0 mmol) of ethyldiisopropylamine was slowly dropped into the mixture. The solution was heated to room temperature, and stirred for 30 minutes. After the reaction was confirmed with TLC, 50 ml of tetrahydrofuran solution containing 1.71 g (5.0 mmol) of 2,3,6,7,10,11-hexahydroxytriphenylene monohydrate was added to the solution while cooled with ice. To the resultant solution, 20 ml of tetrahydrofuran solution containing 4.5 g (35.0 mmol) of ethyldiisopropylamine was slowly dropped. After a catalytic amount of N,N-dimethylaminopyridine was added, the solution was heated to room temperature and stirred for 3 hours. Water and ethyl acetate were added, and the organic portion was collected and washed with diluted hydrochloric acid and saturated aqueous solution of sodium chloride. After the organic portion was dried with magnesium sulfate anhydride, the solvent was distilled away under reduced pressure. The residue was purified through a silica-gel column chromatography (eluting solvent: mixture of ethyl acetate and hexane), and from the product 5.6 g of the compound (7) [yield: 65%] was crystallized in methanol.

$^1$H NMR (400 MHz, CDCl$_3$) δ0.97 (18H, t, J=7.20 Hz), 1.40-1.60 (12H, m), 1.70-1.80 (12H, m), 3.89 (12H, t, J=6.40 Hz), 4.66 (12H, bs), 6.44 (6H, d, J=15.6 Hz), 6.70-6.90 (24H, m), 7.32 (6H, d, J=15.6 Hz), 8.18 (6H, s);

Mass spectrum (M+Na)/(POSI)=1740; phase transition temperature: C-157° C.-$N_D$-181° C.-Iso

SYNTHESIS EXAMPLE 5

The procedures of Synthesis Example 4 were repeated except that the same molar amount of 4-propyloxyphenol was used in place of 4-butoxyphenol, to prepare the compound (6) [yield: 40% (total yield of the three steps)].

$^1$H NMR (400 MHz, CDCl$_3$) δ1.03 (18H, t, J=7.20 Hz), 1.77 (12H, q, t, J=7.2 Hz, 6.4 Hz), 3.85 (12H, t, J=6.4 Hz), 4.66 (12H, d, J=4.0 Hz), 6.45 (6H, d, J=16.0 Hz), 6.70-6.90 (24H, m), 7.32 (6H, d, t, J=16.0 Hz, 4.0 Hz), 8.17 (6H, s); Mass spectrum (M+Na)/(POSI)=1656; phase transition temperature: C-127° C.-Col-160° C.-$N_D$-182° C.-Iso

SYNTHESIS EXAMPLE 6

The procedures of Synthesis Example 4 were repeated except that the same molar amount of 4-hexyloxyphenol was used in place of 4-butoxyphenol, to prepare the compound (8) [yield: 44% (total yield of the three steps)].

$^1$H NMR (400 MHz, CDCl$_3$) δ0.91 (18H, t, J=7.20 Hz), 1.30-1.50 (36H, m), 1.75 (12H, t, t, J=7.20 Hz, 6.40 Hz), 3.87 (12H, t, J=6.40 Hz), 4.66 (12H, bs), 6.44 (6H, d, J=15.6 Hz), 6.70-6.85 (24H, m), 7.31 (6H, d, J=15.6 Hz), 8.11 (6H, s); Mass spectrum (M+Na)/(POSI)=1909; phase transition temperature: C-125° C.-$N_D$-149° C.-Iso

SYNTHESIS EXAMPLE 7

The compound (10) was synthesized according to the following reaction formula.

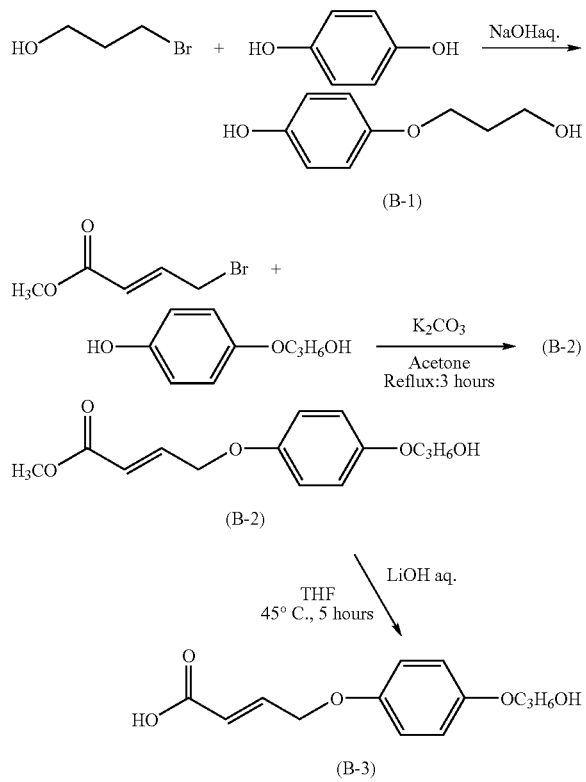

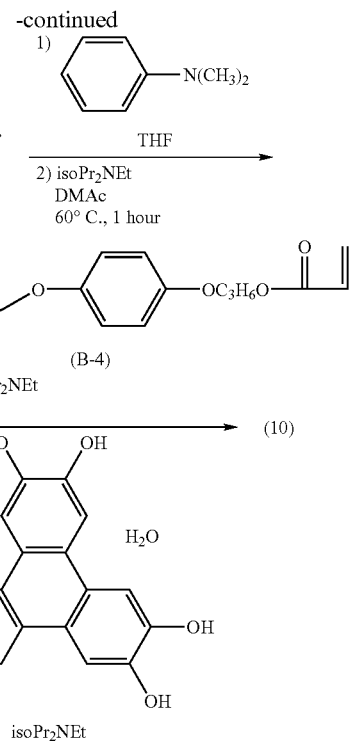

To 1 liter of aqueous solution containing 51.9 g (1.28 mol) of sodium hydroxide, 36.0 g (0.33 mol) of hydroquinone, 62.4 g (0.45 mol) of 3-bromo-1-propanol were added. The mixture was heated-and refluxed for 6 hours, and then cooled. While chilled with ice, the solution was neutralized with sulfuric acid. After ethyl acetate was added, the organic portion was collected. The solvent was then distilled away under reduced pressure. The residue was purified through a silica-gel column chromatography (eluting solvent: mixture of ethyl acetate and hexane), and from the product 27.8 g of the compound (B-1) [yield: 51%] was crystallized in the mixed solvent of ethyl acetate and hexane.

Under nitrogen gas atmosphere, 500 ml of acetone solution containing 36.5 g (0.17 mol) of methyl 4-bromocrotonate (85%), 25.2 g (0.15 mol) of the compound (B-1) and 41.5 g (0.3 mol) of calcium carbonate was stirred, heated and refluxed for 5 hours. After the calcium carbonate was filtered off, the solvent was distilled away under reduced pressure. To the product, water and ethyl acetate were added. The organic portion was collected and washed with diluted hydrochloric acid and saturated aqueous solution of sodium chloride. After the organic portion was dried with magnesium sulfate anhydride, the solvent was distilled away under reduced pressure. The residue was purified through a silica-gel column chromatography, to obtain 33.8 g of the compound (B-2) [yield: 85%].

To 300 ml of tetrahydrofuran solution containing 33.8 g (127 mmol) of the compound (B-2), 240 ml of aqueous solution containing 8.6 g (0.2 mol) of lithium hydroxide monohydrate was added. After 50 ml of methanol was added, the solution was heated to 45° C. and stirred for 5 hours. The solution was then neutralized with diluted hydrochloric acid, and water and ethyl acetate were added. The organic portion was collected and washed with diluted hydrochloric acid and saturated aqueous solution of sodium chloride. After the organic portion was dried with magnesium sulfate anhydride, the solvent was distilled away under reduced pressure. From the residue, 26.9 g of the compound (B-3) [yield: 84%] was crystallized in a mixed solvent of ethyl acetate and hexane.

Under nitrogen gas atmosphere, 12.2 g (100 mmol) of dimethylaniline, 0.3 ml of nitrobenzene and 9.2 g (100 mmol) of acryloyl chloride were added to 250 ml of tetrahydrofuran solution containing 20.6 g (82 mmol) of the compound (B-3). The mixture was stirred at 60° C. for 3 hours. After the mixture was cooled, water and ethyl acetate were added. The organic portion was collected and washed with diluted hydrochloric acid and saturated aqueous solution of sodium chloride. After the organic portion was dried with magnesium sulfate anhydride, the solvent was distilled away under reduced pressure. The residue was dissolved in 200 ml of N,N-dimethylacetamide, and 10.2 g (100 mmol) of triethylamine was added. The obtained solution was stirred at 60° C. for 2 hours. After the solution was cooled, water and ethyl acetate were added. The organic portion was collected and washed with diluted hydrochloric acid and saturated aqueous solution of sodium chloride. After the organic portion was dried with magnesium sulfate anhydride, the solvent was distilled away under reduced pressure. From the residue, 18.1 g of the compound (B-3) [yield: 72%] was crystallized in a mixed solvent of ethyl acetate and hexane.

While chilled with ice, 3.9 g (34.3 mmol) of methanesulfonyl chloride was added to 300 ml of tetrahydrofuran solution containing 10.5 g (34.3 mmol) of the compound (B-3), and then 4.4 g (34.3 mmol) of ethyldiisopropylamine was slowly dropped into the mixture. The solution was heated to room temperature, and stirred for 30 minutes. After the reaction was confirmed with TLC, 150 ml of tetrahydrofuran solution containing 1.47 g (4.3 mmol) of 2,3,6,7,10,11-hexahydroxytriphenylene monohydrate was added to the solution while cooled with ice. To the resultant solution, 50 ml of tetrahydrofuran solution containing 3.9 g (30.1 mmol) of ethyldiisopropylamine was slowly dropped. After a catalytic amount of N,N-dimethylaminopyridine was added, the solution was heated to room temperature and stirred for 3 hours. Water and ethyl acetate were added, and the organic portion was collected and washed with diluted hydrochloric acid and saturated aqueous solution of sodium chloride. After the organic portion was dried with magnesium sulfate anhydride, the solvent was distilled away under reduced pressure. The residue was purified through a silica-gel column chromatography (eluting solvent: mixture of ethyl acetate and hexane), and from the product 5.4 g of the compound (10) [yield: 61%] was crystallized in methanol.

$^1$H NMR (400 MHz, CDCl$_3$) δ2.14 (12H, t, t, J=6.40 Hz, 6.40 Hz), 3.99 (12H, t, J=6.40 Hz), 4.35 (12H, t, J=6.40 Hz), 4.67 (12H, bs), 5.83 (6H, d, J=10.4 Hz), 6.13 (6H, d, d, J=10.4 Hz, 17.6 Hz), 6.41 (6H, d, J=17.6 Hz), 6.44 (6H, d, J=15.6 Hz), 6.75-6.90 (24H, m), 7.32 (6H, d, J=15.6 Hz), 8.18 (6H, s); Mass spectrum (M+Na)/(POSI)=2077; phase transition temperature: C-97° C.-N$_D$-125° C.-Iso

SYNTHESIS EXAMPLE 8

The procedures of Synthesis Example 7 were repeated except that the same molar amount of 2-bromoethanol was used in place of 3-bromo-1-propanol, to prepare the compound (9) [yield: 25% (total yield of the five steps)].

$^1$H NMR (400 MHz, CDCl$_3$) δ4.12 (12H, t, J=4.80 Hz), 4.47 (12H, t, J=4.80 Hz), 4.64 (12H, bs), 5.86 (6H, d, J=10.4 Hz), 6.17 (6H, d, d, J=10.4 Hz, 17.2 Hz), 6.40-6.50 (12H, m), 6.70-6.90 (24H, m), 7.32 (6H, d, J=15.6 Hz), 8.10 (6H, s); Mass spectrum (M+Na)/(POSI)=1992; phase transition temperature: C-65° C.-N$_D$-101° C.-Iso

SYNTHESIS EXAMPLE 9

The procedures of Synthesis Example 7 were repeated except that the same molar amount of 4-bromo-1-butanol was used in place of 3-bromo-1-propanol, to prepare the above compound (11) [yield: 15% (total yield of the five steps)].

$^1$H NMR (400 MHz, CDCl$_3$) δ1.75-1.95 (24H, m), 3.93 (12H, bs), 4.23 (12H, bs), 4.67 (12H, bs), 5.82 (6H, d, J=10.4 Hz), 6.11 (6H, d, d, J=10.4 Hz, 15.6 Hz), 6.41 (6H, d, J=15.6 Hz), 6.45 (6H, d, J=15.6 Hz), 6.70-6.90 (24H, m), 7.33 (6H, d, J=15.6 Hz), 8.19 (6H, s); Mass spectrum (M+Na)/(POSI)=2161; phase transition temperature: Co-170° C.-N$_D$-100° C.-Iso The discotic compound according to the invention can behave as liquid crystal either by itself or when mixed with other liquid crystal. When the discotic compound of the invention is mixed with other discotic liquid crystal compounds, the compound of the invention is contained preferably in the range of 1 to 100 wt. %, more preferably in the range of 10 to 98 wt. %, and most preferably in the range of 30 to 95 wt. %, based on the total weight of the mixture.

[Optically Anisotropic Layer]

The optically anisotropic element comprising aligned molecules of the discotic compound represented by the formula (I) can be used as an optically anisotropic layer of phase retarder (or optical compensatory sheet). The optically anisotropic layer gives optical anisotropy on the basis of the alignment of the molecules.

The optically anisotropic layer can be prepared from a composition comprising not only the discotic compound of the invention but also a material for controlling the alignment of the molecules, another material for fixing the alignment and other materials. The discotic compound of the invention is heated up to the liquid crystal phase-forming temperature so that molecules thereof may be aligned, and then cooled with the alignment of the molecules maintained. In this way, the molecules can be fixed without disturbing the alignment. Otherwise, the discotic compound is mixed with a polymerization initiator to prepare a composition, and heated up to the liquid crystal phase-forming temperature so that the molecules are polymerized. The composition is then cooled to fix the alignment of the molecules. In the present invention, the thus-fixed alignment is preferably and typically identical with the alignment in which the molecules are oriented. However, they may be different from each other as long as the fixed alignment is stably kept and not changed even if the temperature changes in the range of normally 0° C. to 50° C., severely −30° C. to 70° C. and even if external force (for example, given by external field) is applied.

If once the alignment is fixed, the liquid crystal composition no longer needs to behave as liquid crystal. For example, in the case where a polymerizable liquid crystal compound is used, molecules thereof may be thermo- or photo-chemically polymerized or cross-linked to prepare a polymer that no longer behaves as liquid crystal.

[Phase Retarder]

The phase retarder comprises an optically anisotropic layer formed from the discotic compound of the invention. In other words, the discotic compound of the invention is used as a material for the optically anisotropic layer. For example, in the case where a polymerizable discotic compound according to the invention is used to prepare the optically anisotropic layer, the compound is polymerized alone or with other compounds to form an optically anisotropic layer made of a polymer containing units derived from the compound of the invention. The thus-formed optically anisotropic layer is also included in the present invention.

The phase retarder typically comprises a transparent support and an optically anisotropic layer formed from the discotic compound of the invention. The optically anisotropic layer can be formed by the steps of: coating an orientation layer with a composition comprising the discotic compound of the invention and, if needed, other additives; and fixing molecules of the discotic compound in the manner described above. If once the alignment of the molecules is fixed, the formed optically anisotropic layer can be transferred onto another support. This is because the molecules fixed when they are aligned can keep the alignment without the orientation layer. Accordingly, the phase retarder does not always need to comprise an orientation layer. The optically anisotropic layer has a thickness of preferably 0.1 to 20 μm, more preferably 0.2 to 15 μm, and most preferably 0.5 to 10 μm.

[Additives of Optically Anisotropic Layer]

In preparing the optically anisotropic layer, additives may be mixed with the discotic compound. Examples of the additives include an agent for controlling alignment of molecules on the interface between the layer and air (alignment controller for air interface), an anti-repelling agent, a polymerization initiator and a polymerizable monomer.

[Alignment Controller for Air Interface]

Liquid crystal molecules on the interface between the layer and air are oriented with a pre-tilt angle of the interface. The pre-tilt angle is categorized into three. One is an angle between the interface and the direction of refractive index nx, another is an angle between the interface and the direction of refractive index ny, and the other is an angle between the interface and the direction of refractive index nz. The pre-tilt angle depends upon the liquid crystal compound, and hence it is necessary to control the pre-tilt angle so that the aimed characters might be obtained.

The pre-tilt angle is preferably controlled with additives though it can be controlled by applying external field such as electric field or magnetic field.

A preferred example of the additives is a compound having a substituted or non-substituted aliphatic group having 6 to 40 carbon atoms or having an oligosiloxanoxy group substituted with a substituted or non-substituted aliphatic group having 6 to 40 carbon atoms. The number of the aliphatic group or the oligosiloxanoxy group is preferably two or more. The hydrophobic excluded volume-effect compound described in Japanese Patent Publication No. 2002-20363 can be used as the alignment controller for air interface.

The alignment controller is added in an amount of preferably 0.001 to 20 wt. %, more preferably.0.01 to 10 wt. %, and most preferably 0.1 to 5 wt. %, based on the amount of the discotic compound.

[Anti-repelling Agent]

In order to prevent the orientation layer from repelling the composition containing the discotic compound, a polymer material is preferably added to the composition. There is no particular restriction on the polymer material as long as it does not give unfavorable effects to the discotic compound.

Examples of the polymer material are described in Japanese Patent Provisional Publication No. 8(1996)-95030, and particularly cellulose esters are preferred. Examples of the cellulose esters include cellulose acetate, cellulose acetatepropionate, hydroxypropyl cellulose and cellulose acetatebutyrate. The polymer material of anti-repelling agent is added in an amount of preferably 0.1 to 10. wt. %, more preferably 0.1 to 8 wt. %, and most preferably 0.1 to 5 wt. %, based on the amount of the discotic compound. The material in an amount of the above range hardly disturbs the alignment of discotic molecules.

[Polymerization Initiator]

In the present invention, molecules of the discotic compound are preferably oriented and fixed in mono-domain alignment. Namely, it is preferred that the molecules be evenly aligned and fixed. Accordingly, if the discotic compound is polymerizable, the molecules thereof are fixed preferably by a polymerization reaction, which may be a thermal polymerization reaction caused by a thermal polymerization initiator, a photo-polymerization reaction caused by a photo polymerization initiator or a polymerization reaction caused by electron beams. The photo-polymerization reaction or electron beam-polymerization reaction is preferred for fear that the support or other parts may thermally deform or deteriorate during the thermal polymerization reaction. Examples of the photo-polymerization initiators include a-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951, 758, 3,046,127), combinations of triarylimidazoles and p-aminophenyl ketones (described in U.S. Pat. No. 3,549, 367), acridine or phenazine compounds (described in Japanese Patent Provisional Publication No. 60(1985)-105667 and U.S. Pat. No. 4,239,850) and oxadiazole compounds (described in U.S. Pat. No. 4,212,970). The amount of the photo polymerization initiator is preferably in the range of 0.01 to 20 wt. %, and more preferably in the range of 0.5 to 5 wt. % based on the solid content of the coating solution. The light irradiation for the photo polymerization is preferably conducted with ultraviolet rays. The exposure energy is preferably in the range of 10 to 50,000 mJ/cm$^2$, and more preferably in the range of 50 to 800 mJ/cm$^2$. The light irradiation can be conducted while the layer is heated to accelerate the photo-polymerization reaction. If the aimed polymerization degree is not obtained in air, oxygen gas content in the atmosphere is preferably lowered by, for example, introducing nitrogen gas. This is because the oxygen gas content relates to the polymerization degree. The oxygen gas content is preferably 10% or less, more preferably 7% or less, most preferably 3% or less.

[Polymerizable Monomer]

To the liquid crystal composition for forming the optically anisotropic layer, a polymerizable monomer may be added. There is no particular restriction on the polymerizable monomer usable with the liquid crystal compound, as long as it is compatible with the liquid crystal compound and it neither changes the inclined angle nor disturbs the alignment of the liquid crystal molecules. Preferred are compounds having polymerizable ethylenically unsaturated groups such as vinyl, vinyloxy, acryloyl and methacryloyl. The amount of the polymerizable monomer is generally in the range of 0.5 to 50 wt. %, preferably in the range of 1 to 30 wt. %. Particularly preferred is a monomer having two or more reactive functional groups because adhesion between the orientation layer and the optically anisotropic layer can be improved.

[Coating solvent]

As a solvent for preparing the liquid crystal composition or the coating solution, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

[Coating Method]

The optically anisotropic layer is formed by the steps of: dissolving or dispersing the liquid crystal composition in the above solvent to prepare a coating solution, spreading the coating solution to coat the orientation layer, and aligning molecules of the discotic compound. The coating solution can be spread according to a conventional coating method (such as a wire-bar coating method, an extrusion coating method, a direct gravure coating method, a reverse gravure coating method or a die coating method).

[Orientation Layer]

The orientation layer can be formed by rubbing treatment of an organic compound (preferably a polymer), by oblique evaporation of an inorganic compound, by formation of a micro groove layer or by stimulation of an organic compound (e.g., ω-tricosanoic acid, dioctadecylmethy-lammonium chloride, methyl stearate) according to a Langmuir-Blodgett (LB) method. Further, the aligning function of the orientation layer can be activated by applying an electric or magnetic field to the layer or by irradiating the layer with light.

Any method can be used to form the orientation layer as long as molecules of the discotic compound can be oriented in a desired alignment. However, in the invention, the orientation layer is preferably formed by rubbing a polymer layer or by irradiating a polymer layer with light. The rubbing treatment can be conducted by rubbing a polymer layer with paper or cloth several times in a certain direction, but is preferably conducted in the manner described in "Liquid Crystal Handbook (written in Japanese)", published by Maruzen. The orientation layer has a thickness preferably of 0.01 to 10 μm, and more preferably of 0.05 to 3 μm.

After aligned with the orientation layer, liquid crystal molecules are fixed with the alignment kept to form an optically anisotropic layer. The thus-formed optically anisotropic layer can be transferred onto a polymer film (or a transparent support). The liquid crystal molecules fixed when they are aligned can keep the alignment without the orientation layer. Accordingly, the resultant phase retarder does not need to comprise the orientation layer (although the orientation layer is indispensable for producing the phase retarder).

Surface energy of the orientation layer is controlled with a polymer material (normally used for the orientation layer) so that the discotic molecules may be aligned. Examples of the polymer materials for orientation layer are described in many publications. Even if formed from any polymer material, the orientation layer preferably has polymerizable groups to improve the adhesion between the discotic compound and the transparent support. The polymer material may have polymerizable groups at side chains of the repeating units or may have polymerizable substituent groups of cyclic groups. The orientation layer preferably forms chemical bonds with liquid crystal molecules on the interface, and such orientation layer is disclosed in Japanese Patent Provisional Publication No. 9(1997)-152509.

[Rubbing Density of Orientation Layer]

The pre-tilt angle of discotic molecules on the interface between the orientation layer and the liquid crystal layer has a relation to rubbing density of the orientation layer. In fact, the higher the rubbing density is, the smaller the pre-tilt angle is. The lower the rubbing density is, the larger the pre-tilt angle is. Accordingly, the pre-tilt angle can be controlled by controlling the rubbing density. The rubbing density can be controlled in the manner described in "Liquid Crystal Handbook (written in Japanese)", published by Maruzen (2000). The rubbing density (L) is defined by the formula (A):

$$L=Nl\{1+(2\pi rn/60v)\} \quad (A)$$

in which N stands for how many times the layer is rubbed, l stands for the contact length between the layer and the rubbing roller, r stands for a radius of the rubbing roller, n stand for revolutions of the roller (rpm), and v stands for velocity of the moving stage (per second). According to the formula (A), the rubbing density can be increased by repeating the rubbing treatment, by increasing the contact length, by enlarging the radius of roller, by revving up the roller or by moving the stage more slowly. If the rubbing density is wanted to decrease, these may be inversely operated.

[Transparent Support]

The phase retarder may have a support. The support is preferably transparent. There is no particular restriction on the material of the support as long as it is optically isotropic and has a transmittance of 80% or more, but a polymer film is preferably used. Examples of the polymer include cellulose esters (e.g., cellulose diacetate, cellulose triacetate), norbornene-based polymers and polymethacrylic esters. Many commercially available polymers can be used. In consideration of optical characters, cellulose esters are preferred, and cellulose esters of lower fatty acids are more preferred. The term "lower fatty acids" means fatty acids having 6 or less carbon atoms. The number of carbon atoms is preferably 2 (cellulose acetate), 3 (cellulose propionate) or 4 (cellulose butyrate). Cellulose triacetate is particularly preferred. Cellulose esters of mixed fatty acids such as cellulose acetate propionate and cellulose acetate butyrate are also usable. In addition, polymers that originally show birefringence (e.g., polycarbonate, polysulfone) can be also used if modified in the manner described in WO00/26705 to decrease the birefringence.

Cellulose esters preferably used for the transparent support are described below in detail. As the cellulose ester, cellulose acetate having an acetic acid content of 55.0 to 62.5% is preferably used. The acetic acid content is more preferably in the range of 57.0 to 62.0%. The term "acetic acid content" means the amount of combined acetic acid per one unit weight of cellulose. The acetic acid content is determined according to ASTM: D-817-91 (tests of cellulose acetate). The cellulose ester has a viscosity average polymerization degree (DP) of preferably 250 or more, more preferably 290 or more. Further, it is also preferred for the cellulose ester to have a narrow molecular weight distribution of Mw/Mn (Mw and Mn are weight and number average molecular weights, respectively) determined by gel permeation chromatography. The value of Mw/Mn is preferably in the range of 1.0 to 1.7, more preferably in the range of 1.3 to 1.65, and most preferably in the range of 1.4 to 1.6.

In a cellulose ester, hydroxyl groups at 2-, 3- and 6-position of cellulose are not equally substituted (namely, the substitution degree at each position is not equal to one third of the total substitution degree), and the substitution degree at 6-position is apt to be relatively small. In the cellulose ester used in the invention, however, the substitution degree at 6-position is preferably larger than those at 2- and 3-positions. The substitution degree at 6-position is preferably 30% to 40%, more preferably 31% to 40%, most preferably 32% to 40%, based on the total substitution degree. Further, the substitution degree at 6-position is preferably 0.88 or more. The hydroxyl at 6-position may be replaced with an acyl group having 3 or more carbon atoms other than acetyl group (e.g., propionyl, butylyl, valeronyl, benzoyl, acryloyl). The substitution degree at each position can be measured by means of NMR. A cellulose ester having a high substitution degree at 6-position can be prepared according to the methods described in Japanese Patent Provisional Publication No. 11(1999)-5851.

The polymer film, particularly, the cellulose acetate film of the transparent support may contain a retardation-increasing agent, to have a proper retardation. The retardation-increasing agent is preferably an aromatic compound having at least two aromatic rings. The retardation-increasing agent is incorporated in an amount of preferably 0.01 to 20 weight parts, more preferably 0.05 to 15 weight parts, most preferably 0.1 to 10 weight parts, based on 100 weight parts of the cellulose acetate. Two or more aromatic compounds may be used in combination. The aromatic ring in the aromatic compound may be an aromatic hydrocarbon ring or an aromatic heterocyclic ring.

As the aromatic hydrocarbon ring, a six-membered ring (namely, a benzene ring) is particularly preferred. The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring. Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred. The aromatic compound preferably contains at least one 1,3,5-triazine ring.

The number of aromatic rings in the aromatic compound is preferably in the range of 2 to 20, more preferably in the range of 2 to 12, further preferably in the range of 2 to 8, and most preferably in the range of 2 to 6. The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group. [In this case, a spiro-bonding is not formed because the rings are aromatic.] The relation of the aromatic rings may be any of the cases (a) to (c). The retardation-increasing agent is described in PCT Publication Nos. 01/88574 and 00/2619, Japanese Patent Provisional Publication Nos. 2000-111914, 2000-275434 and Japanese Patent Application No. 2002-70009.

After a cellulose acetate solution (dope) is prepared, the cellulose acetate film is prepared from the dope according to a solvent casting method. The above retardation-increasing agent may be added to the dope. The dope is cast on a drum or a band, and then evaporated to form the film. Before casting the dope, the concentration of the dope is so adjusted that the solid content of the dope is in the range of 18 to 35 wt. %. The surface of the drum or band is preferably polished to give a mirror plane. The casting and drying-stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035. The drum or band preferably has a surface temperature of not higher than 10° C. when the dope is cast on the support. After casting the dope, the dope is preferably dried in flowing air for at least 2 seconds. The formed film is peeled off the drum or band, and the film can be further dried with hot air to remove the solvent remaining in the film. The temperature of the air can be gradually elevated from 100 to 160° C. The above-mentioned method is described in Japanese Patent Publication No. 5(1993)-17844. According to the method, the time for casting and peeling steps can be shortened. This method requires that the dope be set to gel at the surface temperature of the drum or band.

For preparing the dope, flakes of the materials are dissolved in a solvent such a halogenated hydrocarbon (e.g., dichloromethane), an alcohol (e.g., methanol, ethanol, butanol), an ester (methyl formate, methyl acetate) or an ether (dioxane, dioxolane, diethyl ether). A typical solvent for dissolving cellulose acylate is dichloro-methane, but in consideration of protecting the global environmental conditions and working conditions, the solvent preferably contains essentially no halogenated hydro-carbon such as dichloromethane. This means the content of halogenated hydrocarbon is preferably less than 5 wt. % or less (more preferably less than 2 wt. %). The cellulose acylate film essentially free from halogenated hydrocarbon and the preparation process thereof are described in Japan institute of invention and innovation technical report No. 2001-1745.

Two or more cellulose ester solutions (dopes) thus prepared can be cast to form a film having two or more layers. The dopes are cast on a drum or a band, and then evaporated to form the film. Before casting the dopes, the concentration of each dope is so adjusted that the solid content is in the range of 10 to 40 wt. %. The surface of the drum or band is preferably polished to give a mirror plane. In the case where two or more cellulose acetate solutions are used, the solutions may be cast from nozzles provided at intervals in the transferring direction of the support to form a layered film. This method is described in, for example, Japanese Patent Provisional Publication Nos. 61(1986)-158414, 1(1989)-122419 and 11(1999)-198285. The solutions may be cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933. The method described in Japanese Patent Provisional Publication No. 56(1981)-162617 can be also adopted. In that method, a highly viscous cellulose acetate solution is enclosed with a low viscous one, and then the thus-combined solutions are simultaneously extruded and cast.

The cellulose acetate film can be stretched to control the retardation. The stretching ratio is preferably in the range of 0 to 100%. The film is preferably stretched with a tenter. In stretching the film with a tenter, the film are held on both sides with moving clips and then released. The difference between the moving speeds of clips is preferably as small as possible, and the difference of releasing timing is also preferably as small as possible.

A plasticizer can be added to the cellulose ester film to improve the mechanical strength. The plasticizer has another function of shortening the time for the drying process. Phosphoric esters and carboxylic esters are used as the plasticizer. Examples of the phosphoric esters include triphenyl phosphate (TPP) and tricresyl phosphate (TCP). Examples of the carboxylic esters include phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred. The amount of the plasticizer is preferably in the range of 0.1 to 25 wt. %, more preferably in the range of 1 to 20 wt. %, and most preferably in the range of 3 to 15 wt. % based on the amount of the cellulose ester.

Deterioration inhibitors (e.g., antioxidizing agent, peroxide decomposer, radical inhibitor, metal inactivating agent, oxygen scavenger, amine) or ultraviolet absorber can be incorporated into the cellulose ester film. The deterioration inhibitors are described in Japanese Patent Provisional Publication Nos. 3(1991)-199201, 5(1993)-1907073, 5(1993)-194789, 5(1993)-271471 and 6(1994)-107854. The deterioration inhibitor is preferably added in the range of 0.01 to 1 wt. %, and more preferably in the range of 0.01 to 0.2 wt. % based on the amount of the prepared solution (dope). If the amount is less than 0.01 wt. %, the effect of the deterioration inhibitor cannot be expected. If the amount is more than 1 wt. %, the inhibitor often bleeds out on the surface of the film. Butyrated hydroxytoluene (BHT) is particularly preferred a deterioration inhibitor. The ultraviolet absorber is described in Japanese Patent Provisional Publication No. 7(1995)-11056.

The cellulose ester film is preferably subjected to surface treatment. Examples of the surface treatment include corona discharge treatment, glow discharge treatment, flame treatment, acid treatment, alkali treatment, and ultraviolet (UV) treatment. An undercoating layer disclosed in Japanese Patent Provisional Publication No. 7(1995)-333433 may be provided. In order to ensure planeness of the cellulose acetate film, the temperature of the film is preferably kept under the glass transition temperature (Tg), namely 150° C. or less.

In consideration of adhesion onto the orientation layer, the cellulose acetate film is preferably subjected to the acid or alkali treatment. This means the cellulose acetate is preferably saponified.

The alkali-saponification treatment is explained below, by way of example.

The process of alkali-saponification treatment preferably comprises the steps of: immersing the film in an alkaline solution, neutralizing with an acidic acid, washing with water, and drying. The steps may be repeated. The alkaline solution is a solution of potassium hydroxide or sodium hydroxide. The normality of hydroxyl ion in the solution is preferably in the range of 0.1 to 3.0 N, more preferably in the range of 0.5 to 2.0 N. The temperature of the alkaline solution is preferably in the range of room temperature to 90° C., more preferably in the range of 40 to 70° C.

The cellulose acetate film has a surface energy of preferably 55 mN/m or more, more preferably 60 to 75 mN/m.

The cellulose acetate film has a thickness of preferably 5 to 500 µm, more preferably 20 to 250 µm, further preferably 30 to 180 µm, and most preferably 30 to 110 µm.

The phase retarder can be combined with a polarizing membrane to produce an elliptically polarizing plate. In addition, the phase retarder and the polarizing membrane can be installed in a liquid crystal display of transmission type, reflection type or semi-transmission type, to enlarge the viewing angle. The elliptically polarizing plate and the liquid crystal display equipped with the phase retarder are described below.

[Elliptically Polarizing Plate]

The phase retarder and a polarizing membrane are laminated to produce an elliptically polarizing plate. The elliptically polarizing plate equipped with the phase re-tarder can enlarge the viewing angle of liquid crystal display. Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films. The polarizing membrane has a polarizing axis perpendicular to the stretching direction.

The polarizing membrane is laminated on the optically anisotropic layer-side of the phase retarder. A transparent protective film is preferably laminated on the polarizing membrane on the side opposite to the optical compensatory sheet. The transparent protective film preferably has a transmittance of 80% or more. The transparent protective film is preferably made of cellulose ester or tricetyl cellulose. The film of cellulose ester is preferably prepared according to the solvent-cast method. The transparent protective film preferably has a thickness of preferably 20 to 500 µm, more preferably 50 to 200 µm.

[Liquid Crystal Display]

The phase retarder enlarges the viewing angle of liquid crystal display. A liquid crystal display normally comprises a liquid crystal cell, a polarizing element and a phase retarder (optical compensatory sheet). The polarizing element generally comprises a polarizing membrane and a protective film. The polarizing membrane and the protective film may be the same as those described above for the elliptically polarizing plate. The phase retarder (optical compensatory sheet) for liquid crystal cell of TN mode is described in Japanese Patent Provisional Publication No. 6(1994)-214116, U.S. Pat. Nos. 5,583,679 and 5,646,703 and German Patent Publication No. 391160A1. The optical compensatory sheet for liquid crystal cell of IPS or FLC mode is described in Japanese Patent Provisional Publication No. 10(1998)-54982. The optical compensatory sheet for liquid crystal cell of OCB or HAN mode is described in U.S. Pat. No. 5,805,253 and PCT Publication No. WO96/37804. The optical compensatory sheet for liquid crystal cell of STN mode is described in Japanese Patent Provisional Publication No. 9(1997)-26572. The optical compensatory sheet for liquid crystal cell of VA mode is described in Japanese Patent No. 2,866,372.

In accordance with the above publications, the phase retarder (optical compensatory sheet) of the invention can be applied for liquid crystal displays of various modes. Examples of the modes include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode. In particular, the phase retarder optically compensates a liquid crystal display of TN (twisted nematic) mode very effectively.

EXAMPLE 1

(Preparation of Orientation Layer)

The denatured polyvinyl alcohol shown below and glutaric aldehyde (5 wt. % based on the denatured polyvinyl alcohol) were dissolved in a mixed solvent of methanol/water (ratio by volume: 20/80), to prepare a 5 wt. % coating solution for orientation layer.

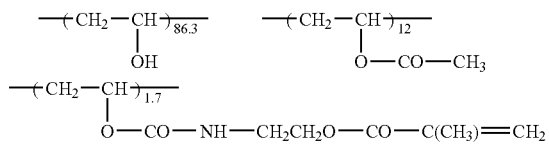

The prepared solution was then spread to coat a cellulose acetate film (thickness: 80 μm, size: 270 mm×100 mm, TD80U, FUJI PHOTOFILM CO. LTD.), dried in hot flowing air at 100° C. for 120 seconds, and subjected to rubbing treatment, to form an orientation layer of 0.5 μm thickness.

(Formation of Optically Anisotropic Layer)

The rubbed surface of the orientation layer was coated with a dichloromethane solution of the compound (7) by means of a wire bar coater of #4. The thus-treated film was kept in a thermostat to align molecules of the compound, and immediately cooled to fix the alignment in glass state. Thus, an optically anisotropic layer of 1.9 μm thickness was formed.

EXAMPLE 2

The orientation layer prepared in the same manner as in Example 1 was coated, by means of a wire bar coater of #4, with a dichloromethane solution of mixed liquid crystal consisting of 75 weight parts of the compound (4) and 25 weight parts of the following compound (X). The thus-treated film was kept in a thermostat to align molecules of the compounds, and immediately cooled to fix the alignment in glass state. Thus, an optically anisotropic layer of 2.0 μm thickness was formed.

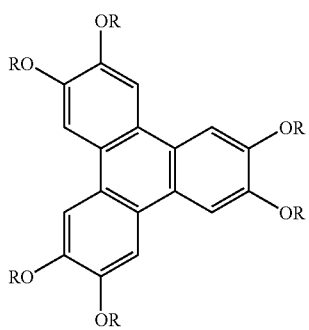

Compound (X)

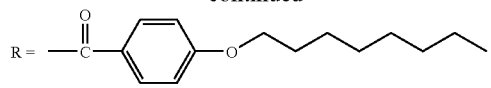

COMPARISON EXAMPLE 1

(Formation of Optically Anisotropic Layer)

The orientation layer prepared in the same manner as in Example 1 was coated with a dichloromethane solution of the above compound (X) by means of a wire bar coater of #4. The thus-treated film was kept in a thermostat to align molecules of the compound, and immediately cooled to fix the alignment in glass state. Thus, an optically anisotropic layer of 2.3 μm thickness was formed.

COMPARISON EXAMPLE 2

(Formation of Optically Anisotropic Layer)

The orientation layer prepared in the same manner as in Example 1 was coated with a dichloromethane solution of the following compound (Y) by means of a wire bar coater of #4. The thus-treated film was kept in a thermostat to align molecules of the compound, and immediately cooled to fix the alignment in glass state. Thus, an optically anisotropic layer of 1.9 μm thickness was formed.

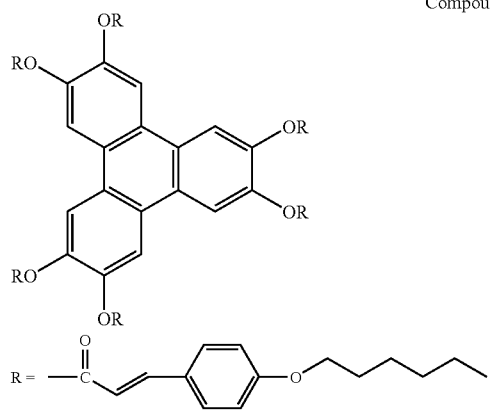

Compound (Y)

[Evaluation of Phase Retarder]

(Measurement of Δn)

The retardation of each optically anisotropic layer prepared above was measured at 632.8 nm by means of an ellipsometer (APE-100, Shimadzu Seisakusho Ltd.) in various viewing angles. From the obtained data, the value of Δn was calculated on the assumption of the refractive ellipsoid model according to "Designing Concepts of he Discotic Negative Compensation Films SID98 DIGEST". The results are shown in Table 1.

(Measurement of Wavelength Dispersion)

With respect to each optically anisotropic layer prepared above, the wavelength-dependence of retardation observed parallel to the normal of the film plane was measured by means of KOBRA21ADH (OJI SCIENTIFIC INSTRUMENTS CO., LTD.). The wavelength dispersion was expressed by the ratio of the retardation value at 478 nm per that at 747 nm. The results are shown in Table 1.

(Time for Alignment)

With respect to each optically anisotropic layer prepared above, how long it took for the liquid crystal molecules to orient themselves in mono-domain alignment with-out defect from starting to be heated was measured in a constant temperature. The molecules were observed with a polarizing microscope (OPTIPHOTO2, Nikon), to determine the time. The results are shown in Table 1.

(Production of Liquid Crystal Display)

On a glass plate having an ITO electrode, an orientation layer of polyimide was provided and subjected to a rubbing treatment. This procedure was repeated to prepare two substrates, and the substrates were arranged face-to-face via a 5 μm spacer so that the orientation layers might be inside and so that the rubbing directions might be perpendicular to each other. Between them, a liquid crystal having Δn of 0.0969 (ZL4792, Merck & Co., Inc.) was introduced to prepare a liquid crystal cell of TN mode. The above-prepared phase retarder was laminated on each side of the liquid crystal cell so that the optically anisotropic layer might be on the side near the cell substrate. Further, on the outer face of each phase retarder, a polarizing plate was laminated to produce a liquid crystal display. In the thus-produced liquid crystal display, each phase retarder was placed so that the rubbing direction of orientation layer on the phase retarder might be anti-parallel to the rubbing direction of orientation layer on the neighboring cell substrate. Each polarizing plate was placed so that the absorption axis of the polarizing plate might be parallel to the rubbing direction of orientation layer on the near cell substrate.

Voltage was applied to the liquid crystal cell of the produced liquid crystal display. Transmittances were measured when white and black images were displayed at 2 V and 5 V, respectively. The ratio of them was regarded as the contrast ratio. The angle in which the thus determined contrast ratio was 10 without tone inversion was regarded as the viewing angle. In addition, when white and black images were displayed, angle-dependence of chromaticity was observed with the eyes. The results are shown in Table 1.

TABLE 1

| Phase retarder | Δn | Thickness (μm) | Wavelength dispersion | Time for alignment (sec) | Viewing angle Up-down | Viewing angle Right-left | ΔC |
|---|---|---|---|---|---|---|---|
| Example 1 | 0.10 | 1.9 | 1.17 | 60 | 93° | 145° | A[1] |
| Example 2 | 0.09 | 2.0 | 1.18 | 60 | 93° | 145° | A[1] |
| Com. Ex. 1 | 0.08 | 2.3 | 1.22 | 65 | 92° | 145° | B[2] |
| Com. Ex. 2 | 0.11 | 1.9 | 1.26 | 65 | 92° | 145° | C[3] |

Remark (ΔC)
A[1]: Chromaticity change is scarcely observed.
B[2]: Chromaticity change is observed a little.
C[3]: Chromaticity change is observed.

The results shown in Table 1 indicate that the compound (7) in Example 1 gave wavelength dispersion smaller than the conventional discotic compound in Comparison Example 1. The mixture of the compound (X) in Example 2 also gave small wavelength dispersion. Accordingly, the phase retarder having optically anisotropic layer formed from the compound (7) or the mixture of the compound (4) and the liquid crystal compound (X) can not only optically compensate a liquid crystal cell of TN mode but also reduce chromaticity change, which is caused by the conventional optical compensatory sheet. Further, although the wavelength dispersion was lowered, the Δn given by the compound of the invention was nevertheless almost the same as that given by the conventional discotic compound. The thickness of the layer and the time for aligning are, therefore, almost the same. The wavelength dispersion in Example 1 was small enough to prevent a displayed image from changing chromaticity, as compared with Comparison Example 2 in which the liquid crystal compound (Y) was used. The liquid crystal compound (Y) is a triphenylene compound having a cinnamic acid derivative moiety at the side chain, and is described in Japanese Patent Provisional Publication No. 2001-166147.

EXAMPLE 3

(Preparation of Transparent Support)

The following components were poured into a mixing tank, and stirred and heated to dissolve each component. Thus, a cellulose acetate solution (dope) was prepared.

| Cellulose acetate solution | |
|---|---|
| Cellulose acetate (acetic acid content: 60.9%) | 100 weight parts |
| Triphenyl phosphate | 6.5 weight parts |
| Biphenyldiphenyl phosphate | 5.2 weight parts |
| The following retardation-increasing agent (1) | 0.1 weight part |
| The following retardation-increasing agent (2) | 0.2 weight part |
| Methylene chloride | 310.25 weight parts |
| Methanol | 54.75 weight parts |
| 1-Butanol | 10.95 weight parts |

Retardation-increasing agent (1)

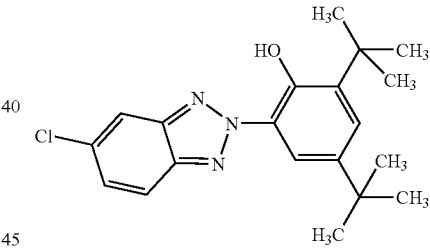

Retardation-increasing agent (2)

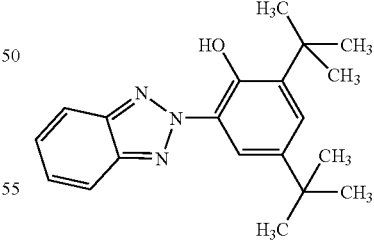

The prepared dope was cast on a drum cooled at 0° C. When the content of solvent reached to 70 wt. %, the formed film was peeled off and fixed at the ends with pin tenter. The film was dried so that the stretching ratio might be 3% in the lateral direction (perpendicular to the direction of the machine), to control the content of solvent in the range of 3 to 5 wt. %. The film was then transferred between the rollers in a heating apparatus, to dry so that the stretching ratio in the direction of the machine might be essentially 0% (in consideration of the fact that the film was stretched by 4% in that direction when peeled off) at a temperature higher than 120° C. and so that the lateral stretching ratio per the ratio in the direction of the machine might be 0.75 at that temperature. Thus, a cellulose acetate film of 100 μm was produced. The retardation of the produced film was measured at 632.8 nm, and as a result, the retardation values along the thickness and in the plane were 40 nm and 4 nm, respectively. The thus-produced cellulose acetate film was used as a transparent support.

(Formation of First Undercoating Layer)

The transparent support was coated with the following coating solution in the amount of 28 ml/m². The spread solution was dried to form a first undercoating layer.

| Coating solution for first undercoating layer | |
| --- | --- |
| Gelatin | 5.44 weight parts |
| Formaldehyde | 1.38 weight parts |
| Salicylic acid | 1.62 weight parts |
| Acetone | 391 weight parts |
| Methanol | 158 weight parts |
| Methylene chloride | 406 weight parts |
| Water | 12 weight parts |

(Formation of Second Undercoating Layer)

On the first undercoating layer, the following coating solution was spread in the amount of 7 ml/m². The spread solution was dried to form a second undercoating layer.

| Coating solution for second undercoating layer | |
| --- | --- |
| The following anionic polymer | 0.77 weight part |
| Mono-ethyl citrate | 10.1 weight parts |
| Acetone | 200 weight parts |
| Methanol | 877 weight parts |
| Water | 40.5 weight parts |
| Anionic polymer | |

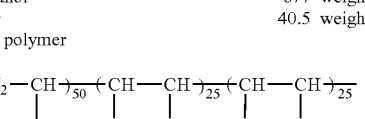

(Formation of Backing Layer)

The back surface of the transparent support was coated with the following coating solution in the amount of 25 ml/m². The spread solution was dried to form a backing layer.

| Coating solution for backing layer | |
| --- | --- |
| Cellulose diacetate (acetic acid content: 55%) | 6.56 weight parts |
| Silica matting agent (mean particle size: 1 μm) | 0.65 weight parts |
| Acetone | 679 weight parts |
| Methanol | 104 weight parts |

(Formation of Orientation Layer)

The following denatured polyvinyl alcohol and glutaric aldehyde (in the amount of 5 wt. % based on the weight of the denatured polyvinyl alcohol) were dissolved in a mixed solvent of methanol/water (20/80, by volume), to prepare a 5% coating solution for orientation layer.

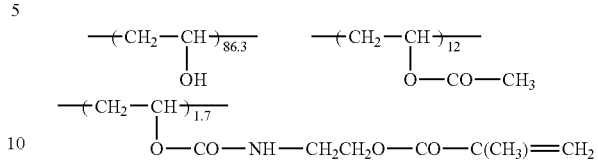

The prepared solution was spread to coat the second undercoating layer, dried in hot flowing air at 100° C. for 120 seconds, and then subjected to rubbing treatment, to form an orientation layer of 0.5 μm thickness. The rubbing direction was parallel to the casting direction of the transparent support.

(Formation of Optically Anisotropic Layer)

The rubbed surface of the orientation layer was coated with the following coating solution by means of a wire bar coater of #4.

| Coating solution for optically anisotropic layer | |
| --- | --- |
| The liquid crystal compound of the invention (compound (10)) | 100 weight parts |
| Ethylene oxide denatured trimethylolpropane triacrylate (V#360, Osaka Organic Chemicals Co., Ltd.) | 9.9 weight parts |
| Photopolymerization initiator (Irgacure 907, Ciba-Geigy) | 3.3 weight parts |
| Sensitizer (Kayacure DETX, Nippon Kayaku Co., Ltd.) | 1.1 weight parts |
| Methyl ethyl ketone | 250 weight parts |

The thus-treated film was kept in a thermostat to align molecules of the compound, and exposed to ultraviolet rays in the amount of 200 mJ/cm² to fix the alignment of the molecules. The film was then cooled to form an optically anisotropic layer of 1.74 μm thickness. Thus, an optical compensatory sheet was produced.

EXAMPLE 4

(Formation of Optically Anisotropic Layer)

The procedures of Example 3 were repeated except that the compound (9) was used in place of the compound (10), to form an optically anisotropic layer of 1.72 μm thickness. Thus, an optical compensatory sheet was produced.

EXAMPLE 5

(Formation of Optically Anisotropic Layer)

The procedures of Example 3 were repeated except that the compound (16) was used in place of the compound (10), to form an optically anisotropic layer of 1.75 μm thickness. Thus, an optical compensatory sheet was produced.

COMPARISON EXAMPLE 3

The orientation layer formed in the same manner as in Example 3 was coated with the following coating solution by means of a wire bar coater of #4.

| Coating solution for optically anisotropic layer | |
|---|---|
| Discotic liquid crystal compound (compound (Z)) | 100 weight parts |
| Ethylene oxide denatured trimethylolropane triacrylate (V#360, Osaka Organic Chemicals Co., Ltd.) | 9.9 weight parts |
| Photopolymerization initiator (Irgacure 907, Ciba-Geigy) | 3.3 weight parts |
| Sensitizer (Kayacure DETX, Nippon Kayaku Co., Ltd.) | 1.1 weight parts |
| Cellulose acetate butyrate (CAB-551-0.2, Eastman Chemical) | 2.2 weight parts |
| Cellulose acetate butyrate (CAB-531-1, Eastman Chemical) | 0.55 weight part |
| Methyl ethyl ketone | 250 weight parts |

Compound (Z)

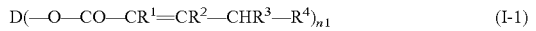
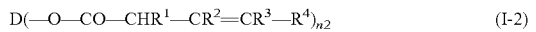

The thus-treated film was kept in a thermostat to align molecules of the compound, and exposed to ultraviolet rays in the amount of 200 mJ/cm² to fix the alignment of the molecules. The film was then cooled to form an optically anisotropic layer of 1.75 μm thickness. Thus, an optical compensatory sheet was produced.

Each phase retarder prepared in the above Examples 3 to 5 and Comparison Example 3 was laminated on each side of the above-prepared TN liquid crystal cell so that each optically anisotropic layer might face the substrate of the cell. Thus, a liquid crystal display was produced.

Voltages of 2 V and 5 V were applied to the liquid crystal cell of the produced liquid crystal display, to display white and black images, respectively. During that, the contrast ratio and angle-dependence of chromaticity were observed with the eyes. As a result, it was confirmed that the phase retarder comprising the discotic compound of the invention not only optically compensates a liquid crystal cell but also enlarges its viewing angle. It is also found that the phase retarder according to the invention more prevents a displayed image from changing chromaticity than the phase retarder of Comparison Example.

We claim:

1. An optically anisotropic element comprising a discotic compound represented by the following formula (I-1) or (I-2), wherein the discotic compound has an oriented discotic plane:

$$D(-O-CO-CR^1=CR^2-CHR^3-R^4)_{n1} \quad (I-1)$$

$$D(-O-CO-CHR^1-CR^2=CR^3-R^4)_{n2} \quad (I-2)$$

in which D is a discotic core; each of n1 and n2 is an integer of 3 to 20; each of $R^1$, $R^2$ and $R^3$ is independently hydrogen, a halogen atom, an alkyl group or a substituted alkyl group and $R^4$ is an aryloxy group or a substituted aryloxy group.

2. The optically anisotropic element as defined in claim 1, wherein D in the formula (I-1) or (I-2) is triphenylene.

3. The optically anisotropic element as defined in claim 1, wherein each of n1 and n2 in the formula (I-1) or (I-2) is 6.

4. The optically anisotropic element as defined in claim 1, wherein each of $R^1$, $R^2$ and $R^3$ in the formula (I-1) or (I-2) is independently hydrogen or methyl.

5. The optically anisotropic element as defined in claim 1, wherein $R^4$ in the formula (I-1) or (I-2) is a substituted aryloxy group, and has a substituent group in which a polymerizable group is positioned at the terminal.

6. The optically anisotropic element as defined in claim 1, wherein the discotic compound represented by the formula (I-1) or (I-2) is a discotic liquid crystal compound.

7. The optically anisotropic element as defined in claim 1, wherein the discotic plane is oriented to form a discotic nematic phase.

8. An optically anisotropic element formed by polymerizing a polymerizable discotic compound represented by the following formula (II-1) or (II-2), wherein the discotic compound has an oriented discotic plane, alignment of said oriented discotic plane being fixed by polymerization:

$$D(-O-CO-CR^1=CR^2-CHR^3-L-Q)_{n1} \quad (II-1)$$

$$D(-O-CO-CHR^1-CR^2=CR^3-L-Q)_{n2} \quad (II-2)$$

in which D is a discotic core; each of n1 and n2 is an integer of 3 to 12; each of $R^1$, $R^2$ and $R^3$ is independently hydrogen or methyl; L is a divalent linking group selected from the group consisting of oxygen atom, carbonyl, an alkylene group, a substituted alkylene group, an arylene group, a substituted arylene group and a combination thereof; and Q is a polymerizable group.

9. The optically anisotropic element as defined in claim 8, wherein D in the formula (II-1) or (II-2) is triphenylene.

10. The optically anisotropic element as defined in claim 8, wherein each of n1 and n2 in the formula (II-1) or (II-2) is 6.

11. The optically anisotropic element as defined in claim 8, wherein L in the formula (II-1) or (II-2) is a group represented by —O-AR-$L^2$- in which AR is an arylene group or a substituted arylene group; and $L^2$ is a divalent linking group selected from the group consisting of oxygen, carbonyl, an alkylene group, a substituted alkylene group and a combination thereof.

12. The optically anisotropic element as defined in claim 8, wherein Q in the formula (II-1) or (II-2) is an epoxy group or an ethylenically unsaturated group.

13. The optically anisotropic element as defined in claim 8, wherein the discotic plane is oriented to form a discotic nematic phase.

14. A triphenylene compound represented by the following formula (III):

(III) 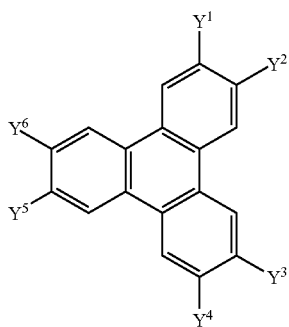

in which each of $Y^1$, $Y^2$, $Y^3$, $Y^4$, $Y^5$ and $Y^6$ is —O—CO—CHR$^1$=CR$^2$—CHR$^3$—R$^4$, or each of $Y^1$, $Y^2$, $Y^3$, $Y^4$, $Y^5$ and $Y^6$ is —O—CO—CHR$^1$—CR$^2$=CR$^3$—R$^4$, wherein each of $R^1$, $R^2$ and $R^3$ is independently hydrogen or methyl; and $R^4$ is an aryloxy group having 6 to 20 carbon atoms, or a substituted aryloxy group having 6 to 20 carbon atoms.

15. The triphenylene compound as defined in claim 14, wherein $R^4$ in the formula (III) is a substituted aryloxy group having 6 to 20 carbon atoms, and has a substituent group in which a polymerizable group is positioned at the terminal.

16. The triphenylene compound as defined in claim 15, wherein the polymerizable group is an epoxy group or an ethylenically unsaturated group.

* * * * *